US012534923B2

(12) United States Patent
Honeycutt

(10) Patent No.: US 12,534,923 B2
(45) Date of Patent: *Jan. 27, 2026

(54) PLATFORM SYSTEM

(71) Applicant: SAFE RACK LLC, Andrews, SC (US)

(72) Inventor: Robert W. Honeycutt, Pawleys Island, SC (US)

(73) Assignee: Safe Rack LLC, Andrews, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/212,566

(22) Filed: Jun. 21, 2023

(65) Prior Publication Data
US 2023/0332420 A1 Oct. 19, 2023

Related U.S. Application Data

(63) Continuation of application No. 17/697,352, filed on Mar. 17, 2022, now Pat. No. 11,739,544, which is a
(Continued)

(51) Int. Cl.
E04G 1/15 (2006.01)
E04G 1/17 (2006.01)
E04G 7/02 (2006.01)
E04F 11/02 (2006.01)
E04F 11/025 (2006.01)
(Continued)

(52) U.S. Cl.
CPC .............. E04G 1/15 (2013.01); E04G 1/17 (2013.01); E04G 7/02 (2013.01); E04F 2011/0209 (2013.01); E04F 11/025 (2013.01); E04F 11/112 (2013.01); E04F 11/181 (2013.01); E04F 2011/1889 (2013.01); E04G 1/14 (2013.01); E04G 1/152 (2013.01); E04G 2001/242 (2013.01); E04G 5/14 (2013.01); E06C 1/397 (2013.01); E06C 7/182 (2013.01); E06C 7/183 (2013.01)

(58) Field of Classification Search
CPC .... E04G 1/15; E04G 1/17; E04G 5/14; E04G 7/02; E06C 7/182
See application file for complete search history.

(56) References Cited

U.S. PATENT DOCUMENTS 1,460,680 A 7/1923 Peters
1,576,635 A 3/1926 Douglas
(Continued)

FOREIGN PATENT DOCUMENTS

BE 1019933 A3 2/2013
CA 2421184 A1 3/2002
(Continued)

OTHER PUBLICATIONS

"Multi-Access Component System Assembly Guide" Cabis Incorporated 2002 modified in 2005. All enclosed pages cited.
(Continued)

Primary Examiner — Colleen M Chavchavadze
(74) Attorney, Agent, or Firm — Nelson Mullins Riley & Scarborough LLP

(57) ABSTRACT

A modular platform system utilizing a number of components including a platform. The platform is configured so that each of the components may interchangeably connect to any side of the platform. The components include, for example, handrails and stairways, as well as other platforms. The platform and most of the components are formed from single, continuous pieces of metal.

8 Claims, 34 Drawing Sheets

Related U.S. Application Data continuation of application No. 16/456,384, filed on Jun. 28, 2019, now Pat. No. 11,447,965, which is a continuation of application No. 14/732,207, filed on Jun. 5, 2015, now Pat. No. 10,358,871, which is a continuation of application No. 13/184,499, filed on Jul. 16, 2011, now abandoned.

(51) Int. Cl.

| | | |
|---|---|---|
| E04F 11/112 | (2006.01) | |
| E04F 11/18 | (2006.01) | |
| E04G 1/14 | (2006.01) | |
| E04G 1/24 | (2006.01) | |
| E04G 5/14 | (2006.01) | |
| E06C 1/397 | (2006.01) | |
| E06C 7/18 | (2006.01) | |

(56) References Cited

U.S. PATENT DOCUMENTS

| | | |
|---|---|---|
| 1,593,783 A | 7/1926 | Stresau |
| 1,960,863 A | 5/1934 | Boyer |
| 2,335,046 A | 11/1943 | Droeger |
| 2,585,150 A | 2/1952 | Mcgill |
| 2,594,561 A | 4/1952 | Huck |
| 2,694,609 A | 11/1954 | Trafford |
| 2,726,123 A | 12/1955 | Mathews |
| 2,783,107 A | 2/1957 | Gacht |
| 2,899,011 A | 8/1959 | Babits |
| 2,989,141 A | 6/1961 | Howard |
| 3,042,140 A | 7/1962 | Basile et al. |
| 3,104,889 A | 9/1963 | Branch |
| 3,250,401 A | 5/1966 | Davidson |
| 3,307,653 A | 3/1967 | Gnehm |
| 3,349,870 A | 10/1967 | Leiblein |
| 3,381,775 A | 5/1968 | Livers |
| 3,425,179 A | 2/1969 | Haroldson |
| 3,477,184 A | 11/1969 | Siivola |
| 3,500,606 A | 3/1970 | Wharmby |
| 3,693,754 A | 9/1972 | Butler |
| 3,698,511 A | 10/1972 | Dohan |
| 4,009,762 A | 3/1977 | Bjerkgard |
| 4,030,255 A | 6/1977 | Hartman |
| 4,060,150 A | 11/1977 | Hughes |
| 4,143,740 A | 3/1979 | Matthews |
| 4,175,889 A | 11/1979 | Phaup |
| 4,319,520 A | 3/1982 | Lanting et al. |
| 4,352,597 A | 10/1982 | Kay |
| 4,355,700 A | 10/1982 | Matthews |
| 4,419,851 A | 12/1983 | Kruger |
| 4,424,752 A | 1/1984 | Aberg |
| 4,527,366 A | 7/1985 | Greene |
| 4,598,510 A | 7/1986 | Wagner, III |
| 4,630,709 A | 12/1986 | Taylor |
| 4,759,162 A | 7/1988 | Wyse |
| 4,869,034 A | 9/1989 | Hammond |
| 4,919,230 A | 4/1990 | Langer |
| 4,982,974 A | 1/1991 | Guidry |
| 5,002,153 A | 3/1991 | Yuen |
| 5,031,723 A | 7/1991 | Hooten |
| 5,210,988 A | 5/1993 | Shaifer |
| 5,337,857 A | 8/1994 | Spalt et al. |
| 5,408,790 A | 4/1995 | Hoesten |
| 5,547,041 A | 8/1996 | Gispert |
| 5,617,931 A | 4/1997 | Zygmun |
| 5,653,459 A | 8/1997 | Murphy |
| 5,779,208 A | 7/1998 | McGraw |
| 5,911,288 A | 6/1999 | Zafirakis |
| 6,032,590 A | 3/2000 | Chen |
| 6,085,867 A | 7/2000 | Daniel, III |
| 6,763,912 B2 | 7/2004 | Robinson |
| 6,810,995 B2 | 11/2004 | Warford |
| 6,918,464 B2 | 7/2005 | Renton |
| 7,500,335 B1 | 3/2009 | Kjose |
| D608,459 S | 1/2010 | Wyse |
| D619,445 S | 7/2010 | Wyse |
| 7,950,095 B2 | 5/2011 | Honeycutt |
| 8,046,858 B2 | 11/2011 | Honeycutt |
| 8,261,393 B2 | 9/2012 | Honeycutt et al. |
| 8,341,821 B2 | 1/2013 | Honeycutt |
| 8,387,191 B2 | 3/2013 | Honeycutt |
| 8,434,273 B1 | 5/2013 | Greene |
| 8,490,234 B2 | 7/2013 | Rowell |
| 8,561,239 B2 | 10/2013 | Honeycutt et al. |
| 8,627,926 B2 | 1/2014 | Gordon |
| 8,746,403 B1 | 6/2014 | Tyner |
| 8,813,430 B2 | 8/2014 | Rees |
| 8,904,714 B2 | 12/2014 | Montalto |
| 9,321,489 B1 | 4/2016 | Dauner |
| 10,358,871 B2 | 7/2019 | Honeycutt |
| D872,310 S | 1/2020 | Honeycutt |
| D878,635 S | 3/2020 | Honeycutt |
| 11,447,965 B2 | 9/2022 | Honeycutt |
| 2001/0017233 A1 | 8/2001 | Panzeri |
| 2002/0189177 A1 | 12/2002 | Eve |
| 2004/0040785 A1 | 3/2004 | Robinson et al. |
| 2004/0188176 A1 | 9/2004 | Wyse |
| 2004/0231920 A1 | 11/2004 | Meeker |
| 2005/0193675 A1 | 9/2005 | Smart |
| 2005/0224287 A1 | 10/2005 | LaBrash |
| 2007/0125602 A1 | 6/2007 | Marbach |
| 2008/0202391 A1 | 8/2008 | Pisano |
| 2009/0139151 A1 | 6/2009 | Quam et al. |
| 2009/0180853 A1 | 7/2009 | Gang |
| 2010/0025954 A1 | 2/2010 | Gottlinger et al. |
| 2010/0031455 A1 | 2/2010 | Honeycutt et al. |
| 2010/0326771 A1 | 12/2010 | Kreller |
| 2011/0047724 A1 | 3/2011 | Honeycutt |
| 2011/0198153 A1 | 8/2011 | Dufour |
| 2011/0278094 A1 | 11/2011 | Gute |
| 2012/0073902 A1 | 3/2012 | Honeycutt |
| 2013/0015016 A1 | 1/2013 | Honeycutt |
| 2014/0367628 A1 | 12/2014 | Hewson et al. |

FOREIGN PATENT DOCUMENTS

| | | |
|---|---|---|
| CA | 2491124 A1 | 1/2004 |
| CA | 2455312 A1 | 7/2005 |
| CA | 2782880 C | 5/2015 |
| DE | 19503543 C2 | 10/1999 |
| DE | 20305795 U1 | 6/2003 |
| DE | 202005005831 U1 | 1/2006 |
| EP | 0140984 A1 | 5/1985 |
| FR | 2672917 A1 | 8/1992 |
| GB | 945822 A | 1/1964 |
| GB | 1212983 A | 11/1970 |
| GB | 2185775 A | 7/1987 |
| GB | 2318607 A | 4/1998 |
| GB | 2518159 B | 3/2021 |
| JP | H04277261 A | 10/1992 |
| JP | H06100021 B2 | 12/1994 |
| WO | 0148321 A1 | 7/2001 |
| WO | 2005116369 A1 | 12/2005 |
| WO | 2009147004 A1 | 12/2009 |
| WO | 2017144769 A1 | 8/2017 |

OTHER PUBLICATIONS

Allscaf Access Scaffolding Through the Ages www.allscafaccess.com.au (Jun. 26, 2018) IPR2020-01566 Ex. 2001 at 1.
Charles Birdsong Expert Declaration IPR2020-01566 Ex. 1011 (Sep. 2 2020).
Christopher Butler Affidavit with Alco-Lite Webpages IPR2020-01566 Ex. 1005 at 3 13-14 18-19 (Sep. 2 2020).
Extended Search Report dated May 23, 2017 in corresponding European patent application No. 12176489.8 all enclosed pages cited.
Geoffrey L. Kulak et al. Guide to Design Criteria for Bolted and Riveted Joints Am. Institute of Steel Consr. (2d ed. 2001) IPR2020-01566 Ex. 1013 at 3 176 177.
Institution Decision Denying Institution IPR2020-01566 Paper 12 (Mar. 25, 2021).

(56) References Cited

OTHER PUBLICATIONS

IPR Petition IPR2020-01566 Paper 1 (Sep. 2 2020).
Patent Owner Preliminary Response IPR2020-01566 Paper 8 (Dec. 30, 2020).
William B. Gorlin Expert Declaration IPR2020-01566 Ex. 2001 (Dec. 30, 2020).
"Supplemental Disclosure of Information" dated Jul. 20, 2022. All enclosed pages cited.
Office Action dated Jul. 29, 2013 in corresponding Canadian patent application 2 782 880. All enclosed pages cited.
Examination Report issued Jan. 22, 2020 in corresponding European patent application 12176489.8. All enclosed pages cited.

PLATFORM SYSTEM

CROSS REFERENCE TO RELATED APPLICATIONS

The present application is a continuation of co-pending U.S. patent application Ser. No. 17/697,352, filed Mar. 17, 2022, which is a continuation of U.S. patent application Ser. No. 16/456,384, filed on Jun. 28, 2019, and entitled "Platform System," now U.S. Pat. No. 11,447,965, which is a continuation of U.S. patent application Ser. No. 14/732,207, filed on Jun. 5, 2015, and entitled "Platform System," now U.S. Pat. No. 10,358,871, which is a continuation of U.S. patent application Ser. No. 13/184,499, filed on Jul. 16, 2011, and entitled "Platform System," now abandoned, the entire disclosures of which are hereby incorporated by reference in its entirety as if set forth verbatim herein and relied upon for all purposes.

FIELD OF THE INVENTION

The present invention relates to fall restraint equipment, and, more particularly, to a modular platform system.

BACKGROUND OF THE INVENTION

Platform systems typically provide access from one location of an area to another and generally fall within one of two categories: crossover platforms and access platforms. Crossover platforms usually provide a path from one location to another while going up and over an area or obstruction and back down to the other area. For instance, crossover platforms may be built to provide a path over pipes, tripping hazards, conveyors, spill containment berms, etc. In contrast, access platforms typically allow a user to reach or access a desired area or object from another location. For example, access platforms may be built to provide access to the mezzanine or office area in a factory, warehouse, or other facility or to provide access to a valve, maintenance hatch, or other object.

A platform system is typically designed for a specific location. The components of the platform system are then manufactured so the platform system can be installed in that location. The location must first be analyzed in order to design the components of the particular platform system to fit the location. The components are then manufactured, and the platform system is installed, which is typically accomplished by the designer and/or manufacturer of the platform system. This is because the designer/manufacturer possesses the knowledge to install the components and/or alter or replace the components should they not fit the location with a satisfactory degree of precision. The necessity that each platform system be designed for a specific location can substantially increase the cost of the platform system. The major portions of such platform systems are presently constructed by a process involving cutting and welding a large number of smaller components together. The process requires a relatively substantial amount of time, manpower, and components.

SUMMARY OF THE INVENTION

The present invention recognizes and addresses the foregoing considerations, and others, of prior art construction and methods.

In this regard, one aspect of the present invention provides a platform that includes a plurality of identical sides. The platform is created from a single, continuous piece of sheet metal that is cut and folded to form the platform. Each side of the platform defines a set of apertures that allow the respective side of the platform to interchangeably connect to one of a plurality of components that are likewise configured to connect to the platform.

Another aspect of the present invention provides a platform system comprising a platform and at least two other components. The platform has a plurality of identical sides, each of which defines a first set of apertures. Each of the other two components defines a second set of apertures. The first set of apertures aligns with the second set of apertures in order to allow the platform to interchangeably connect with either of the two other components. In one embodiment, the other components comprise a handrail and a pair of stairway supports. In other embodiments, the platform system comprises additional components, such as ladders and stands, configured to connect to the platform. The additional components define apertures that align with apertures defined by the platform in order to connect the component to the platform. The apertures also allow the platform to connect to other platforms.

The accompanying drawings, which are incorporated in and constitute a part of this specification, illustrate one or more embodiments of the present invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
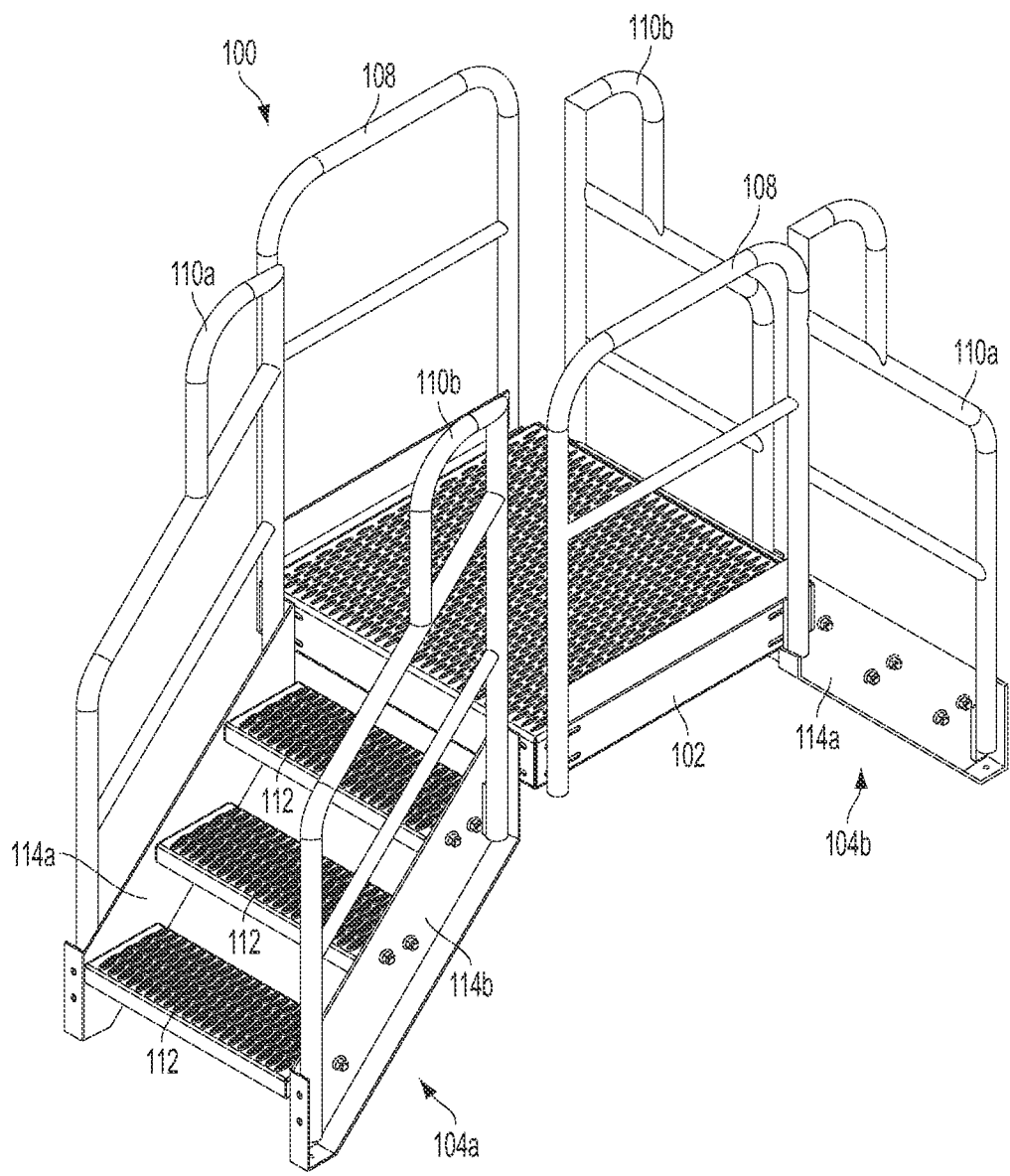
FIGS. 1, 2, and 3 are perspective views of exemplary platform systems in accordance with various embodiments of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Aspects of the present invention are related to fall restraint equipment. Examples of fall restraint equipment and the components thereof are set forth in copending U.S. patent application Ser. No. 12/329,883 (entitled "A Gangway and Method of Manufacturing Same" and filed on Dec. 8, 2008), Ser. No. 12/468,704 (entitled "Fall Restraint Equipment Component and Method for Manufacturing the Same" and filed on May 19, 2009), Ser. No. 12/487,408 (entitled "Fall Restraint Equipment Component and Method for Manufacturing the Same" and filed on Jun. 18, 2009), Ser. No. 12/537,842 (entitled "Fall Restraint Equipment Components and Method for Manufacturing the Same" and filed on Aug. 7, 2009), Ser. No. 12/552,811 (entitled "Gangway Handrail and Method for Manufacturing the Same" and filed on Sep. 2, 2009), Ser. No. 12/837,480 (entitled "Mobile Access Unit and Cage" and filed on Jul. 15, 2010), 61/366,612 (entitled "Gangway Bearing Retainer Plate" and filed on Jul. 22, 2010), and 61/374,541 (entitled "Articulating Cage" and filed on Aug. 17, 2010). The entire disclosure of each of the foregoing applications is hereby incorporated by reference as if set forth verbatim herein.

FIG. 1 of the present invention illustrates an exemplary platform system 100 comprising a platform 102, two stairways 104, and two handrails 108. In the presently-described embodiment, stairways 104a and 104b are connected to one set of opposite sides of platform 102, while platform handrails 108 are connected to the other set of opposite sides of the platform.

As explained in more detail below, each side of platform 102 is configured to interchangeably connect to certain components of the platform systems described herein, such as, for example, stairways 104 and handrails 108, as illustrated in FIG. 1. Moreover, other platforms similar to platform 102 may be connected to any side of platform 102 as described in more detail below with respect to FIGS. 23D and 23E. In the presently-described embodiment, platform handrails 108 are identical to one another. The construction of handrails 108 and the manner by which they are attached to platform 102 are described in more detail below with respect to FIGS. 6, 7A, 7B, and 26.

In this embodiment, stairways 104a and 104b are also identical to one another. Each stairway 104 comprises a pair of stairway supports 114 attached to platform 102 at one end and resting on a surface, such as the ground, on the other. The ensuing explanation refers to the components illustrated in FIGS. 13, 14, and 15, as well as components similar thereto and described herein, as "stairway supports." Those skilled in the art should appreciate, however, that these components may be known as or referred to as "stringers" or "stairway stringers" in the relevant art. Stairway supports 114 may be attached to a surface, the ground, or another component in the manner described below with respect to FIGS. 13, 14, 15, 23A, 23B, 23C, 29A, and 29B. In the present embodiment, stairway supports 114*a* and 114*b* are mirror images of one another but are otherwise similar in construction and use. The construction of stairway supports 114 and the manner by which they are attached to platform 102 are described in more detail below.

Each stairway 104 also comprises two stairway handrails 110 that are connected to stairway supports 114. That is, stairway handrail 110*a* is connected to stairway support 114*a*, while stairway handrail 110*b* is connected to stairway support 114*b*. In this embodiment, stairway handrails 110*a* and 110*b* are mirror images of one another but are otherwise similar in construction, manufacture, and use, as describe in more detail below. Stairways 104 also include one or more steps 112 interposed between stairway supports 114*a* and 114*b*. In this embodiment, steps 112 allow a user to access platform 102. The construction of steps 112 and the manner by which they are attached to stairway supports 114 are described in more detail below.

Figure 2:
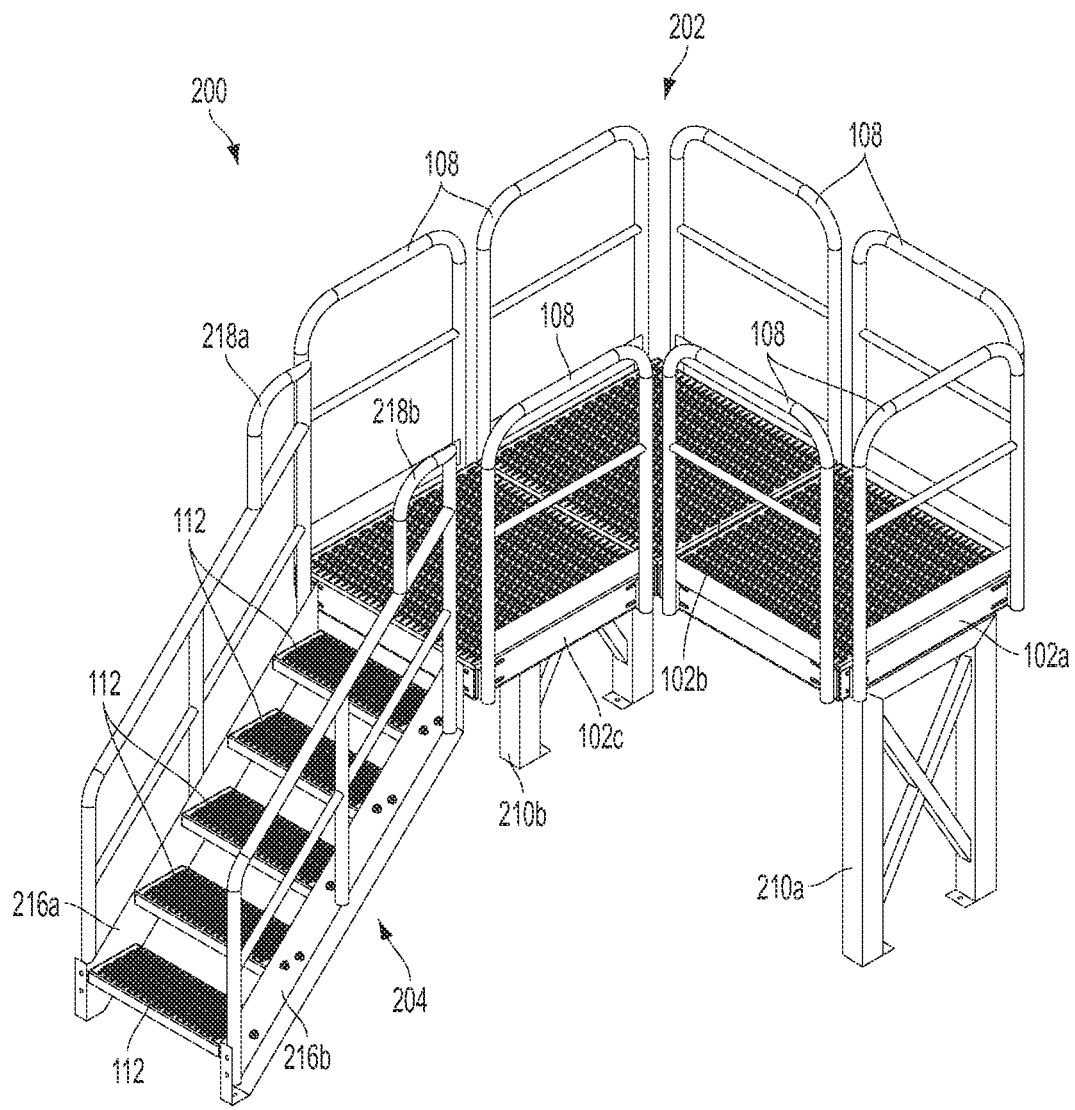

FIG. 2 illustrates another exemplary platform system 200 comprising a platform area 202 connected to a stairway 204. Platform area 202 comprises a plurality of platforms 102 connected to one another. As described above, each side of platforms 102 is configured to interchangeably connect to any of the other platforms, as well as other components of the platform systems described herein, as explained in more detail below. Platform area 202 also includes a plurality of handrails 108 attached to various sides of platforms 102, as illustrated. Also as explained above, any of handrails 108 may be interchangeably attached to any side of platforms 102 to which another component is not already attached.

In the presently-described embodiment, platform system 200, and specifically platform area 202, also comprises two stands 210 connected to the underside of two different platforms 102 in order to provide support to platform area 202. That is, stand 210*a* is connected to platform 102*a*, while stand 210*b* is connected to platform 102*b*. The ensuing explanation refers to the components labeled as 210 in FIG. 2 and those illustrated in FIGS. 17 through 22B, as well as the components similar thereto and described herein, as "stands." Those skilled in the art should appreciate, however, that these components may be known as or referred to as "supports" or "platform supports" in the relevant art. As explained in more detail below, stands connected to and that support the platforms may vary in height in order to account for the location and desired height of the corresponding platforms. It should be understood, however, that each of platforms 102 are configured to interchangeably connect to a stand, if desired, irrespective of the stand's height. The construction of stands 210 and the manner by which they are connected to platforms 102 are described in more detail below with respect to FIGS. 17 through 22B, 27A, and 27B.

Stairway 204 comprises a pair of stairway supports 216 connected to platform 102*c* at one end and may be connected to a surface at the other. Stairway supports 216*a* and 216*b* are mirror images of one another but are otherwise identical in construction and use. Stairway supports 216 are interconnected by a number of steps 112, in a manner similar to that described above with respect to stairway supports 114 and steps 112 of FIG. 1. Additionally, a stairway handrail 218*a* is connected to stairway support 216*a*, while another stairway handrail 218*b* is connected to stairway support 216*b*. Stairway handrails 218*a* and 218*b* are mirror images of one another but are otherwise identical in construction and use.

Those skilled in the art should appreciate that stairway supports 216 and stairway handrails 218 are similar to stairway supports 114 and stairway handrails 110, respectively, of FIG. 1. In this example, however, both stairway supports 216 and stairway handrails 218 exhibit a length greater than respective stairway supports 114 and handrails 110 of FIG. 1 in order to accommodate for the additional steps of platform system 200 and thus its additional height.

Figure 3:
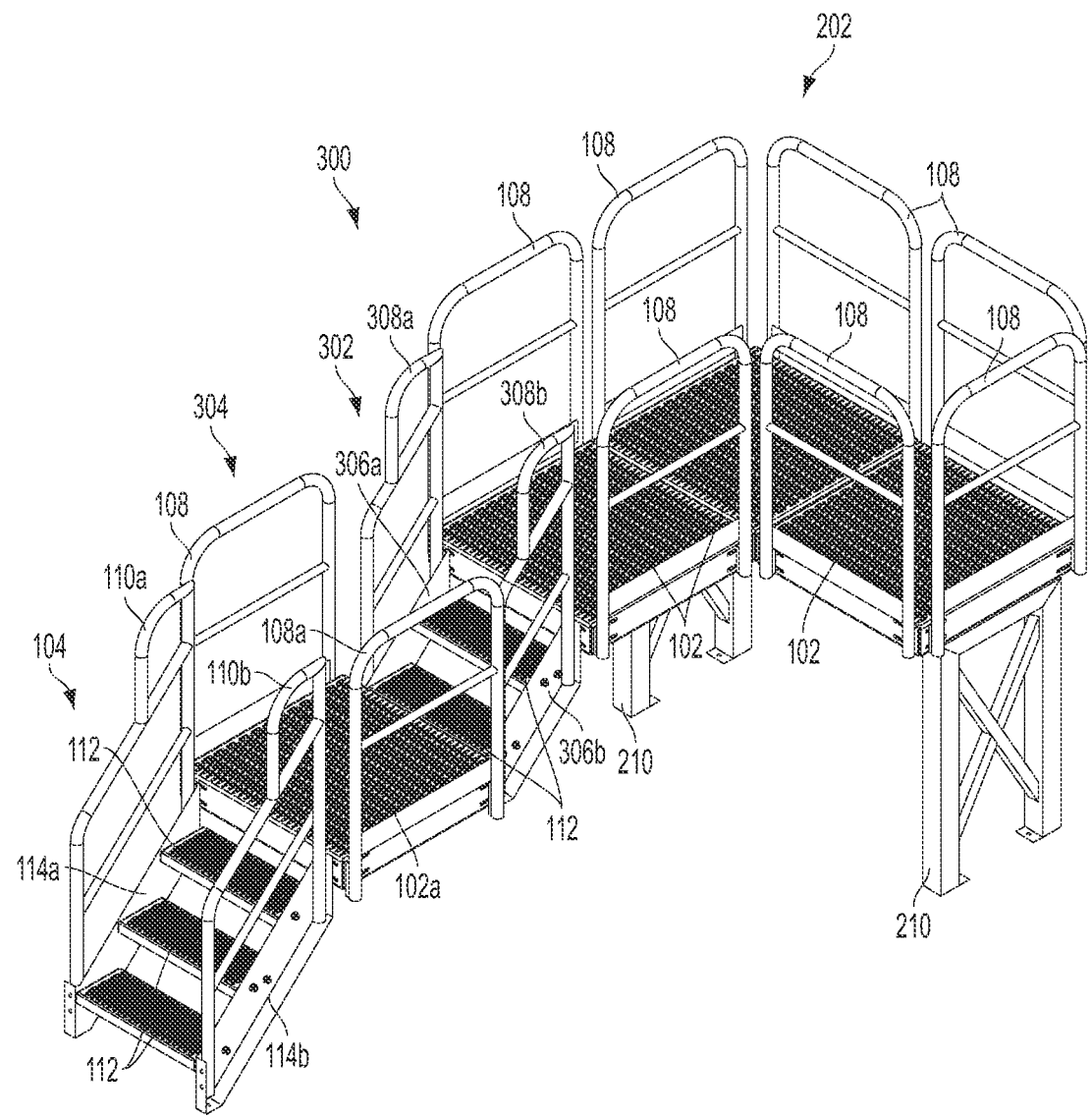

FIG. 3 illustrates yet another exemplary platform system 300 comprising platform area 202, a stairway 302, another platform area 304, and stairway 104. Stairway 302 is connected to platform area 202 on one side and to platform area 304 on the other. The side of platform area 304 opposite the side connected to stairway 302 is connected to stairway 104.

Stairway 302 comprises two stairway supports 306, two stairway handrails 308, and two steps 112. Stairway supports 306*a* and 306*b* are mirror images of one another but are otherwise identical in construction and use. Stairway handrails 308*a* and 308*b* are also mirror images of one another but are otherwise identical in construction and use. Stairway handrail 308*a* is connected to stairway support 306*a*, while stairway handrail 308*b* is connected to stairway handrail 306*b*. Those skilled in the art should appreciate that stairway supports 306 and handrails 308 are similar in construction and use to stairway supports 114 and handrails 110, albeit smaller due to the relatively lesser height of stairway 302 (and the removal of one of steps 112) in comparison to stairway 104. In a manner similar to that described above with respect to stairway 104, steps 112 are interconnected between stairway supports 306, to which stairway handrails 324 and 326 are also connected, respectively. The formation and attachment of the components of the stairways are described in more detail below.

Platform area 304 comprises platform 102*a* and two handrails 108, in a manner similar to that described above with respect to FIG. 1. That is, handrails 108 are connected to opposite sides of platform 102*a*, and stairway 104 is connected to another side of the platform. One side of platform 102*a* is connected to stairway 302 opposite the side connected to stairway 104. In the presently-described embodiment, a user accesses platform area 202 by walking in a straight line stairway 104, across platform area 304, and up stairway 302.

As explained above, each side of platform 102 is configured to interchangeably connect to the components of the platform systems described herein. For instance, any stairway or handrail, another platform, or other components described below may be connected to any of the sides of platform 102. Moreover, a stand may be connected to the underneath of any of the platform's sides. The connection between the components of the platform systems may be accomplished in the manners explained below or in manners similar thereto.

Those skilled in the art should understand from the description that follows that the configurations of the platform systems' components described herein allow the components to be arranged and rearranged in order to design and build a platform system in any desired configuration. For instance, the direction of stairway 104 may be changed to be perpendicular to the direction of stairway 302 by switching the sides of platform 102*a* to which stairway 104 and handrail 108*a* are connected. That is, handrail 108*a* and stairway 104 may be disconnected from platform 102*a*, switched, and reconnected to the platform. A user would then access platform area 202 by walking up stairway 104, turning right approximately ninety (90) degrees ("°"), crossing platform area 304, and continuing up stairway 302 to platform area 202. Those skilled in the art should appreciate that such manipulations in the layout of a platform system similar to platform systems 100, 200, and 300 illustrated in FIGS. 1, 2, and 3 allow the platform system to be configured to meet the unique requirements of the environment in which the platform system is to be installed. That is, the platform system may be modified due to the interchangeability of its components to fit the location in which it will be installed without the necessity to modify the components themselves.

As shown by the examples above, the embodiments of the present invention allow one to design and/or install a platform system for a specific location and use without designing and manufacturing the platform system or its components specifically for that location. As a result, a manufacturer may mass-produce the components as described herein without designing, altering, or manufacturing components specific to the installation; that is, without the necessity to modify the underlying components based upon each installation. Those skilled in the art should appreciate that this allows the manufacturer to maintain a supply of interchangeable parts, which reduces engineering, design, manufacture, and installation costs. It should also be understood that such a platform system and the components thereof allow a system to be customized for each installation regardless of the size or shape of the system needed without any customized manufacturing.

Figure 4:
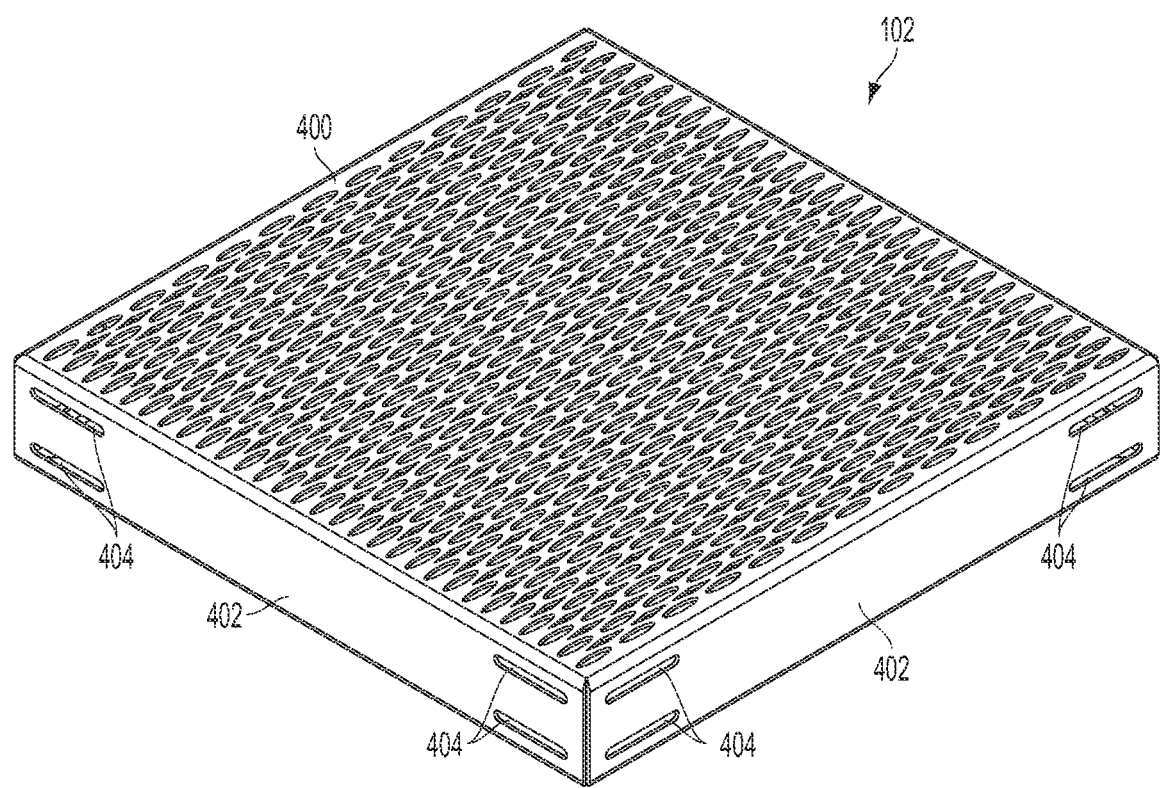
FIG. 4 is a perspective view of a platform for a platform system in accordance with an embodiment of the present invention.

FIG. 4 is a perspective view of platform 102 comprising a top surface 400 surrounded by four identical sides 402. Platform 102 is formed from a single, continuous piece of sheet metal as described below with respect to FIG. 5. In the presently-described embodiment, the single, continuous piece of sheet metal is approximately three-sixteenths inch (3⁄16") plate or sheet metal, although it should be understood that other suitable materials may be used. During formation, the single, continuous piece of sheet metal is lasered or otherwise cut so that each side 402 of platform 102 defines a plurality of apertures 404. Apertures 404 are configured to allow components of a platform system to interchangeably connect to platform 102 as referred to above and described in more detail below. Platform 102 is approximately three feet wide by three feet deep (3'×3') and exhibits a height of approximately six inches (6"). It should be understood, however, that while platform 102 is approximately square in the illustrated embodiment, the platform may be designed to exhibit other shapes, dimensions, and sizes, such as a rectangle, without departing from the scope of the present invention.

Figure 5:
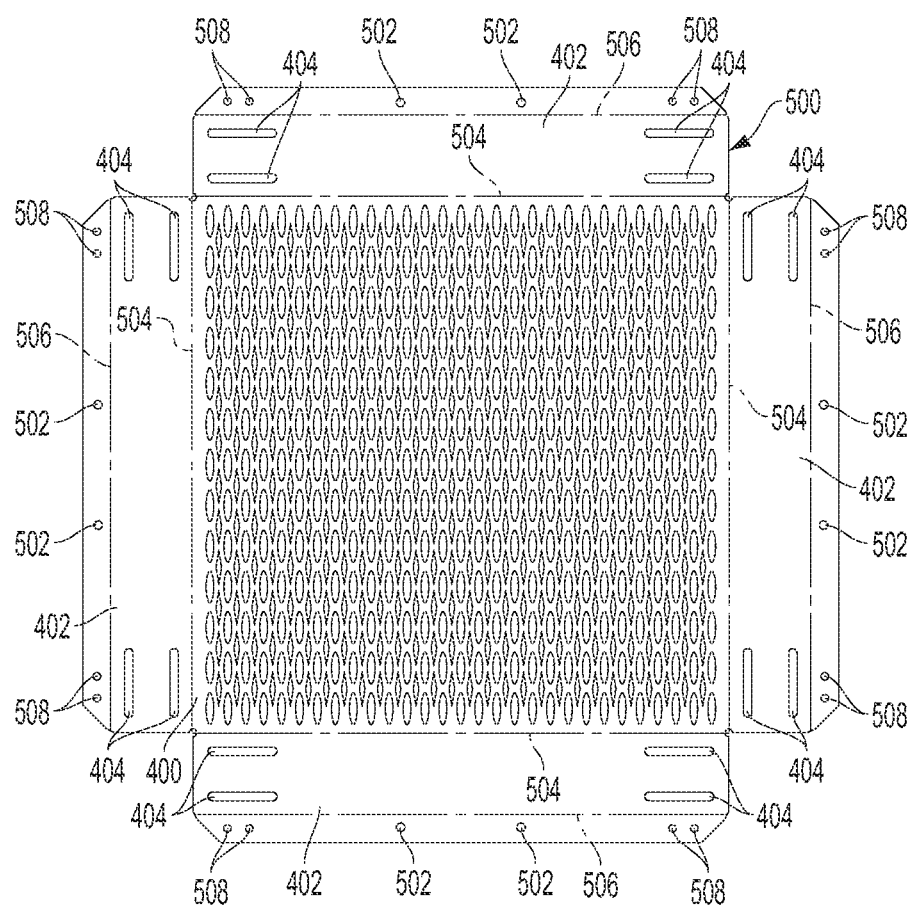
FIG. 5 is a top planar view of a continuous piece of sheet metal cut to form the platform of FIG. 4.

FIG. 5 is a top planar view of a single, continuous piece 500 of sheet metal used to form platform 102 (FIGS. 1 through 4). Referring to FIGS. 4 and 5, single, continuous piece 500 of sheet metal is lasered or otherwise cut to take the form as shown in FIG. 5 and to define apertures 404 described above, as well as additional apertures 502 and 508. The uses of apertures 404, 502, and 508 are described in more detail below. It should be understood that a tube laser, a cutting drill, a screw machine, a handheld plasma or flame torch, or other suitable instrument may be used to laser, butterfly, or otherwise cut continuous piece 500 of sheet metal as described herein.

In order to form continuous piece 500 of metal into platform 102, each side 402 of the continuous piece of metal is folded down with respect to surface 400 along a fold line 504 at approximately a 90° angle. Each side 402 is then folded again inward along a fold line 506 at approximately another 90° angle, thereby forming platform 102. After being folded, the corners/connections between each adjacent side 402 may be welded if desired.

Figure 6:
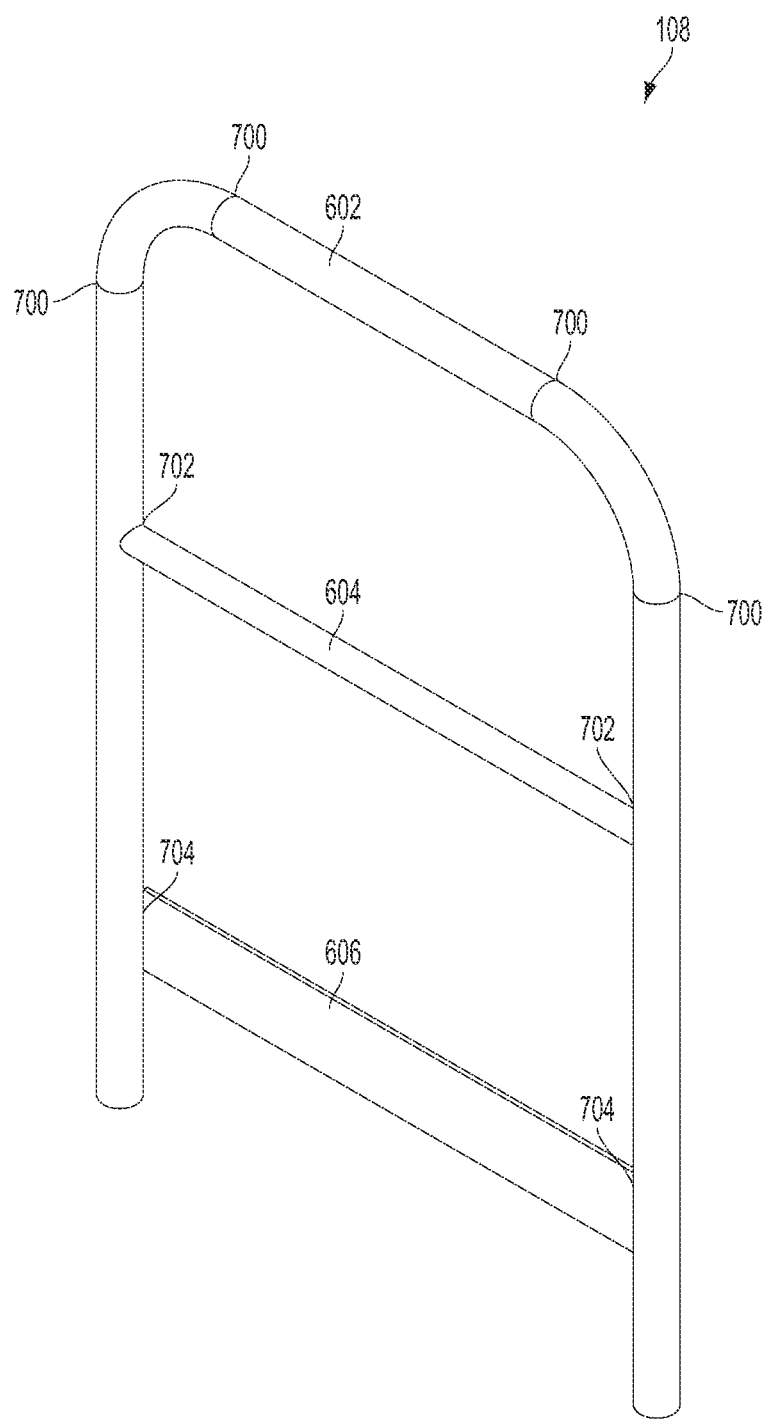
FIG. 6 is a perspective view of a platform handrail for a platform system in accordance with an embodiment of the present invention.

FIG. 6 is a perspective view of platform handrail 108 comprising an outer rail 602 and a midrail 604, each of which is formed from a single, continuous piece of tubular metal. It should be understood that both outer rail 602 and midrail 604 may be manufactured from the same single, continuous piece of tubular metal. That is, the single, continuous piece of tubular metal may be separated into the two continuous pieces of tubular metal that are used to form outer rail 602 and midrail 604, respectively. Handrail 108 further comprises a toeboard 606 formed from a single, continuous piece of sheet metal.

Figure 7A:
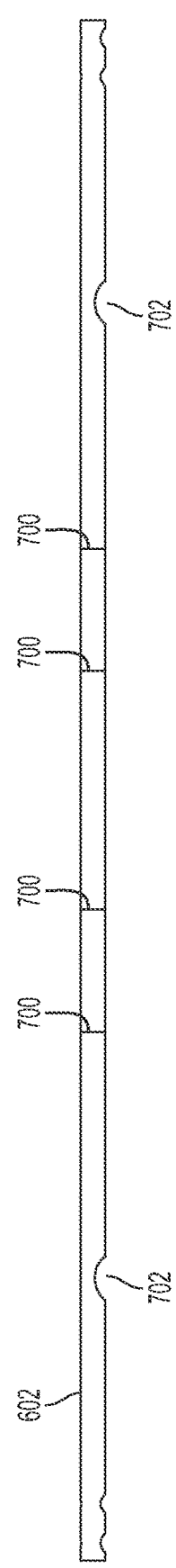
FIGS. 7A and 7B are top and side planar views, respectively, of a continuous piece of tubular metal cut to form the platform handrail of FIG. 6.
Figure 7B:
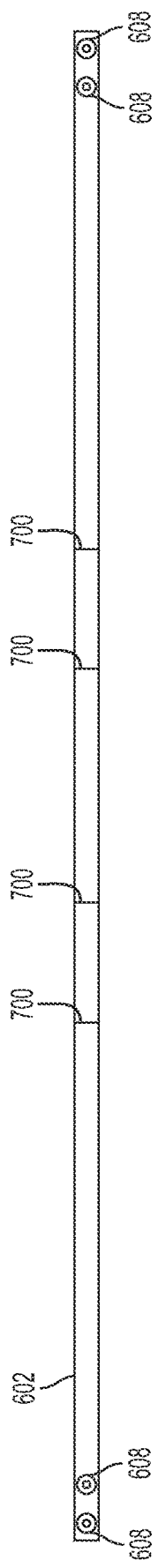

FIGS. 7A and 7B are top and side elevation views, respectively, of the single, continuous piece of tubular metal used to form outer rail 602. Referring to FIGS. 6, 7A, and 7B, the continuous piece of tubular metal is cut to define a plurality of apertures 608 and then folded at approximately forty-five degrees (45°) at each of fold lines 700 in order to form outer rail 602. A threaded insert configured to receive a threaded bolt or other suitable fastener is inserted into each of apertures 608 as illustrated in FIG. 7B. Bolts or suitable fasteners are then passed through apertures defined by other components of the system and inserted into the threaded inserts in order to connect the component to handrail 108 as explained below. For instance, outer rail 602 is connected to platform 102 in this manner as described in more detail with respect to FIG. 26. Examples of suitable threaded inserts are those sold by AVK Instrustrial Products of Valencia, California.

Additionally, outer rail 602 is cut to define apertures on the inner side of the rail at points 702 and 704. As the continuous piece of tubular metal is folded, the ends of midrail 604 and toeboard 606 are inserted into points 702 and 704, respectively, in a manner similar to that described in the patent applications incorporated by reference above and specifically application Ser. No. 12/537,842. The connections between outer rail 602 and midrail 604 and the outer rail and toeboard 606 may be welded if desired.

Figure 8:
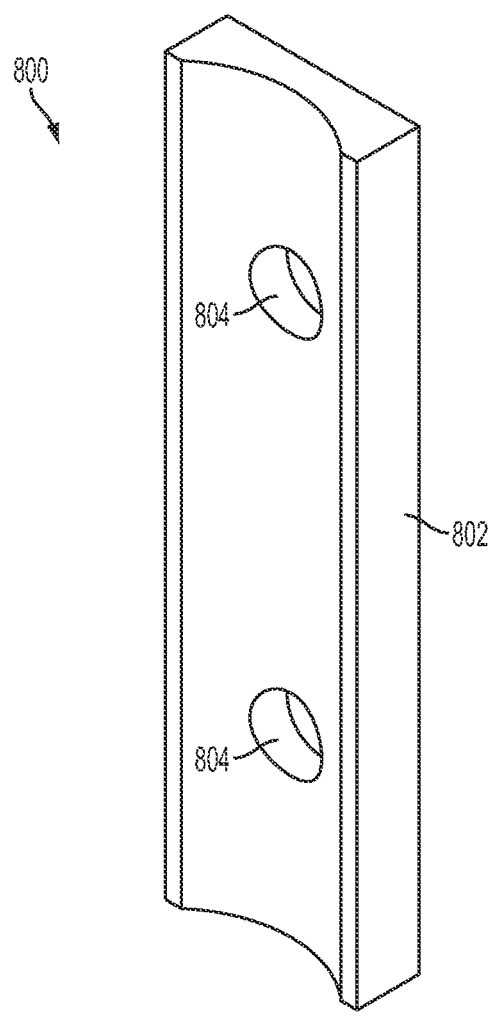
FIG. 8 is a perspective view of a handrail washer that may be used in combination with various handrails in a platform system in accordance with embodiments of the present invention.

FIG. 8 is a perspective view of a handrail washer 800 formed from a single, continuous piece 802 of tubular metal. As with all the other components described herein, it should be understood that other suitable materials may be used to form the components. For instance, handrail washer 800 may be formed from ultra-high molecular weight ("UHMW") polyethylene, polyvinyl chloride ("PVC"), or other suitable type of plastic, as should be understood by those skilled in the art. Single, continuous piece 802 of tubular metal is cut to define apertures 804 and to otherwise take the form as illustrated in FIG. 8. That is, one side of handrail washer 800 exhibits a flat surface, while the opposite side of the washer exhibits a curved, concave surface, as illustrated. Handrail washer 800 may be used to connect a component of the platform system that exhibits a curved surface to one that does not. For instance, handrail washer 800 is placed between a flat side 402 of platform 102 (FIG. 4) and a curved leg of platform handrail 108 (FIG. 6) when the two are connected. The use of handrail washer 800 is described below in further detail with respect to FIGS. 23A and 26.

Figure 9:
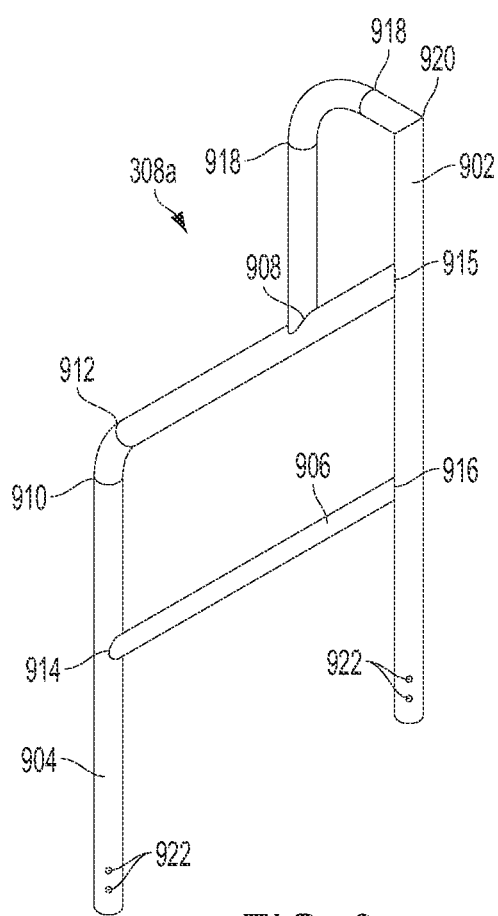
FIGS. 9, 10, 11, and 12 are perspective views of exemplary stairway handrails for a platform system in accordance with various embodiments of the present invention.

FIG. 9 is a perspective view of stairway handrail 308a comprising a first handrail portion 902, a second handrail portion 904 connected to handrail portion 902, and a third handrail portion 906 connected between handrail portions 902 and 904. Each of handrail portions 902, 904, and 906 is formed from a single, continuous piece of tubular metal. As noted above, handrail 308a is a mirror image of handrail 308b (FIG. 3), which is therefore not described in more detail herein.

Second handrail portion 904 is cut to define an aperture at point 908 configured to receive an end of first handrail portion 902 and then folded at approximately 45° at a fold line 910. Second handrail portion 904 is folded at an angle slightly less than 45° at a fold line 912 so that the resulting handrail 900 may be used as a stairway handrail. That is, the angles at which portion 904 is folded cause handrail 308a to exhibit a downward slope in a fashion typically shown by stairway handrails. During formation, second handrail portion 904 is also cut to define an aperture at point 914 configured to receive an end of third handrail portion 906.

First handrail portion 902 is cut to define apertures at points 915 and 916 in order to receive the respective ends of second handrail portion 904 and third handrail portion 906. First handrail portion 902 is then folded at approximately 45° at fold lines 918 and at approximately 90° at another fold line 920. It should be understood that the angles at which portions of handrail 308a are folded are not, in and of themselves, critical to the formation of the handrail, and other angles may be utilized as desired. As first handrail portion 902 is being folded, respective ends of second handrail portion 904 and third handrail portion 906 are inserted into apertures at points 915 and 916, respectively. The connections made by inserting an end of a handrail portion into an aperture defined by another handrail portion may be welded if desired. Furthermore, the base or "leg" of each of handrail portions 902 and 904 are cut to define a pair of apertures 922. In one embodiment, threaded inserts are included within each aperture 922 in order to connect handrail 308a to a stairway support, such as support 306a (FIG. 1), as described in more detail below with respect to FIG. 23A.

Figure 10:
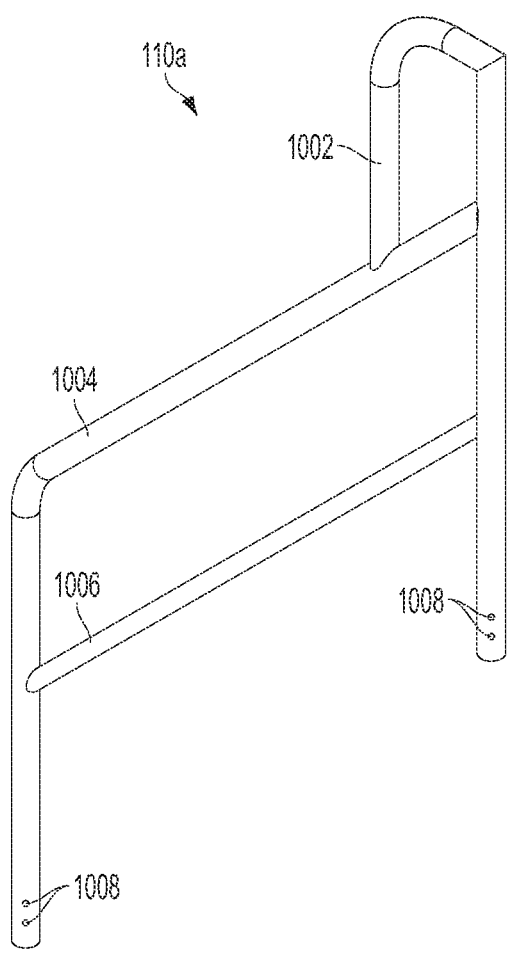

It should be understood that the size of stairway handrail 308a is dependent upon the length of the stairway (and, thus, the number of steps) with which the handrail will be used. It should be appreciated that stairway handrail 308a may be extended and the components thereof enlarged in order to accommodate a stairway of greater length. FIG. 10, for example, illustrates stairway handrail 110a that comprises a first handrail portion 1002, a second handrail portion 1004, and a third handrail portion 1006. Stairway handrail 110a is a mirror image of stairway handrail 110b (FIGS. 1 and 3), which is therefore not described in further detail herein.

Referring additionally to FIG. 9, first handrail portion 1002 is similar in construction and size to handrail portion 902, while handrails portions 1004 and 1006 have been extended in length in comparison to their respective counterparts 904 and 906. Portions 1002 and 1004 are cut to define apertures 1008 that are similar to apertures 922. That is, threaded inserts may be included within apertures 1008 in order to connect handrail 110a to a stairway support, similar to the manner described in more detail below with respect to FIG. 23A. Stairway handrail 110a is otherwise formed in a manner similar to that by which stairway handrail 308a is formed.

Figure 11:
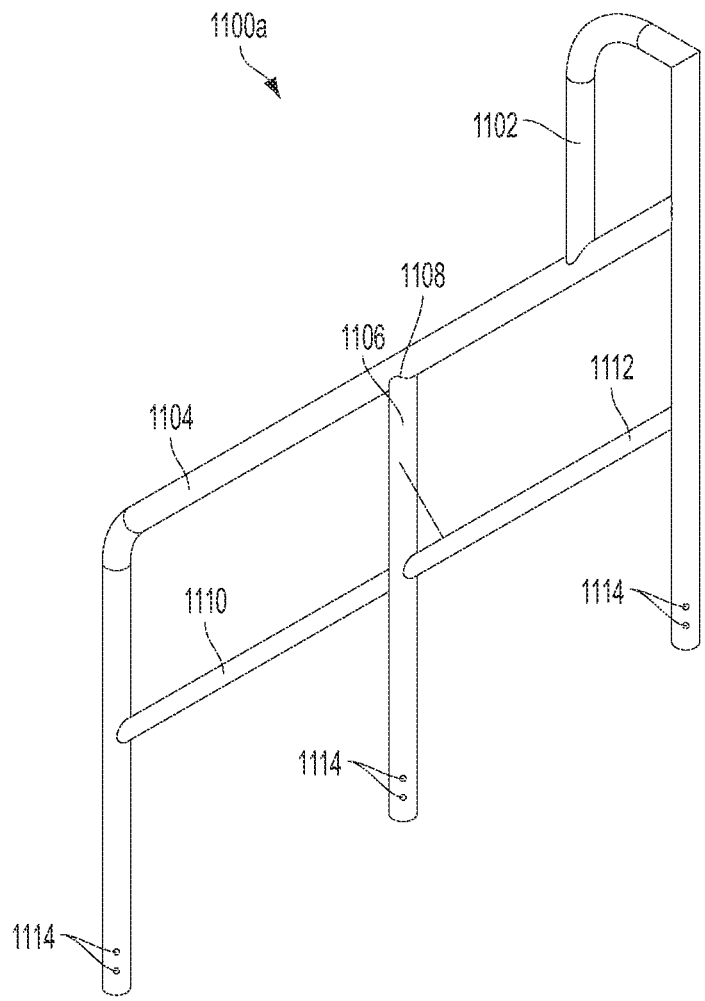

It should be understood, however, that stairway handrail 110a and the components thereof may be further extended to account for stairways of even greater length in comparison to those described above. FIG. 11, for instance, illustrates a stairway handrail 1100a exhibiting a length greater than that of stairway handrail 308a (FIG. 9) and 110a (FIG. 10). In the presently-described embodiment, stairway handrail 1100a comprises a first handrail portion 1102 and a second handrail portion 1104.

Referring additionally to FIGS. 9 and 10, first handrail portion 1102 is similar to first handrail portions 902 and 1002. Second handrail portion 1104, however, has been extended to account for an associated stairway of additional length (i.e., that includes additional steps) in comparison to portions 904 and 1004. Due to the additional length of second handrail portion 1104, an additional vertical handrail portion 1106 is inserted into, and supports, the second handrail portion at an aperture 1108 defined by second handrail portion 1104. In one embodiment, third handrail portions 906 and 1006 have been segmented into two horizontal handrail portions 1110 and 1112. Each side of vertical handrail portion 1106 defines an aperture configured to receive an end of handrail portions 1110 and 1112, respectively. In another embodiment, portions 1110 and 1112 are a single, continuous piece of metal that is inserted into and passed through the apertures defined by the sides of portion 1106 during formation of handrail 1100. Each of portions 1102, 1104, and 1106 are cut to define apertures 1114 similar to apertures 922 and apertures 1008. Stairway handrail 1100a is otherwise formed in a manner similar to that described above with respect to stairway handrails 110a and 308a. Those of ordinary skill in the art should appreciate that handrail portions 1106, 1110, and 1112 are also each formed from single, continuous pieces of tubular metal.

Figure 12:
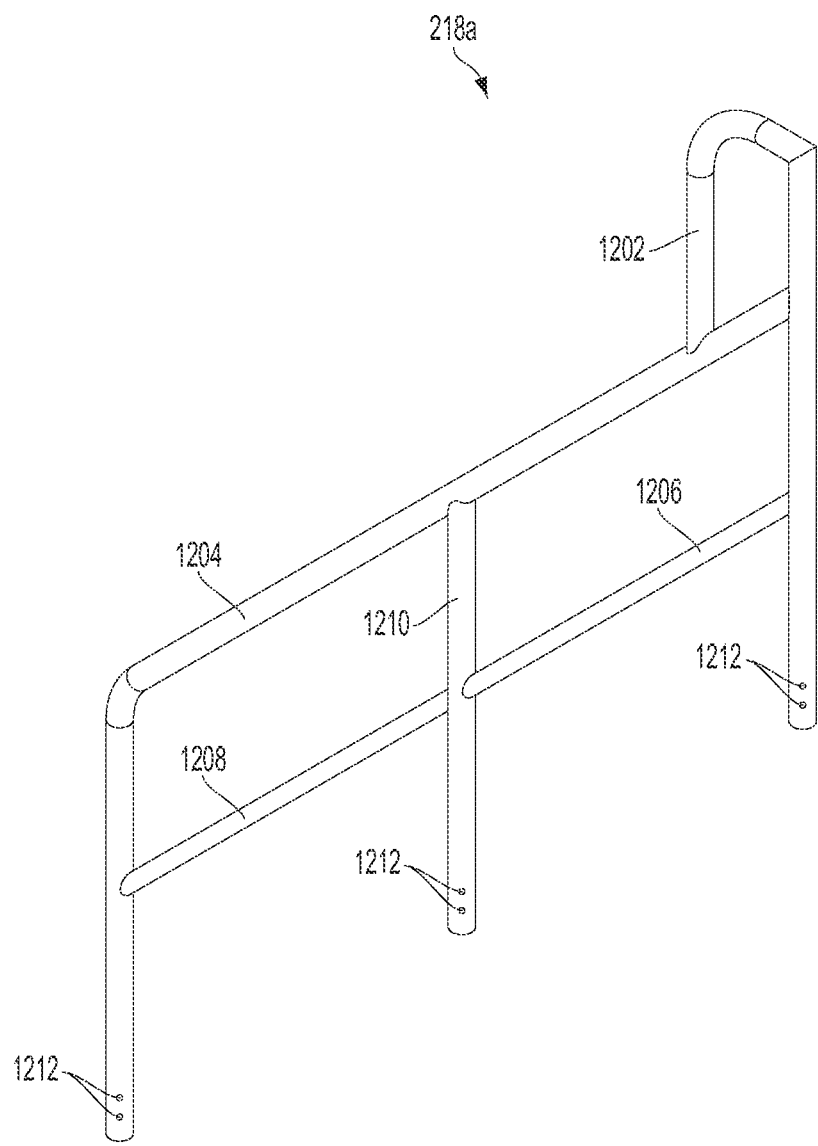

It should be understood from the foregoing explanation that almost any sized stairway handrail may be manufactured in a manner similar to that described above. Referring to FIG. 12, for instance, stairway handrail 218a exhibits a length greater than stairway handrail 1100a (FIG. 11). Handrail 218a is a mirror image of handrail 218b (FIG. 2), which is therefore not described in further detail.

Referring to FIGS. 11 and 12, stairway handrail 218a comprises stairway handrail portions 1202, 1204, 1206, 1208, and 1210 similar to respective portions 1102, 1104, 1112, 1110, and 1106 of handrail 1100a. Each of handrail portions 1202, 1204, and 1210 are cut to define apertures 1212 that are similar to apertures 1114. In certain embodiments, threaded inserts may be included in apertures 1114 and 1212 in order to connect handrails 1100a and 218a, respectively, to corresponding stairway supports, as described in more detail below with respect to FIG. 24A. Handrail 218a is otherwise constructed and formed in a manner similar to that described above with respect to handrail 1100a. It should be understood that handrails 110a, 218a, 308a, and 1100a of FIGS. 10, 12, 9, and 11, respectively, are designed to be located on one side of a stairway, while a mirror image of each handrail is designed to be used on the opposite side of the stairway.

Figure 13:
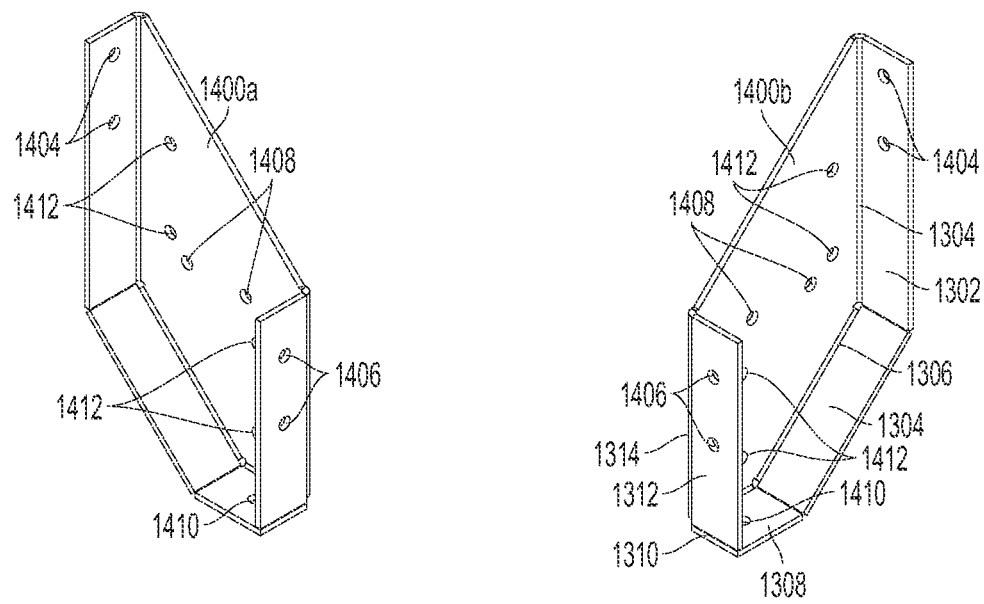
FIG. 13 is a perspective view of an exemplary pair of stairway supports for a platform system in accordance with an embodiment of the present invention.
Figure 14:
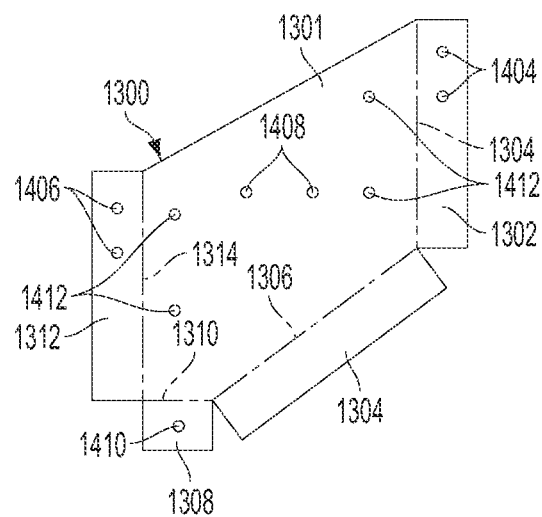
FIG. 14 is a top planar view of a continuous piece of sheet metal cut to form one of the stairway supports of FIG. 13.

FIG. 13 illustrates a pair of stairway supports 1400a and 1400b configured to attach to a platform and to interconnect a step in a manner similar to that described above with regard to stairway supports 114, 216, and 306 of FIGS. 1, 2, and 3, respectively. Each of stairway supports 1400 is formed from a single, continuous piece of sheet metal, although it should be understood that the same single, continuous piece of sheet metal may be used to form both supports. Referring additionally to FIG. 14, a single, continuous piece 1300 of sheet metal may be used to form stairway support 1400b. It should be understood, however, that stairway support 1400b is a mirror image of stairway support 1400a. Thus, while the ensuing explanation is directed to stairway support 1400b, it should be understood that stairway support 1400a is formed in a similar manner.

Single, continuous piece 1300 of metal is first cut in order to take the form illustrated in FIG. 14 in order to form stairway support 1400b. Next, areas 1302, 1304, 1308, and 1312 are folded inward at approximately 90° with respect to an area 1301 at respective fold lines 1304, 1306, 1310, and 1314. Single, continuous piece 1300 of sheet metal is cut to define a plurality of apertures 1404, 1406, 1408, 1410, and 1412.

Apertures 1404 are configured to receive hardware used to connect stairway supports 1400a and 1400b to a platform, such as platform 102 (FIGS. 1 through 4), at one end, in a manner similar to that as described in more detail below with respect to FIGS. 23C and 24C. Similarly, apertures 1406 are configured to receive hardware to connect the stairway supports to another platform at the opposite end, in a manner similar to that described in more detail below with respect to FIG. 23C. Apertures 1408 are configured to receive hardware to connect the stairway support to a step. Thus, apertures 1408 and the approximate hardware allow a step to be interconnected between stairway supports 1400, as described in more detail below with respect to FIGS. 23A, 23B, 24A, and 25A. Apertures 1412 are configured to receive hardware to connect the stairway support to a stairway handrail, as described in more detail below with respect to FIG. 23A.

Apertures 1410 are used to affix the supports to the ground or to a fixed structure if the ends of stairway supports 1400 defining apertures 1410 are located at ground level or on top of the fixed structure. In one embodiment, for example, a pair of bolts or anchors may be affixed to the ground or another structure so that an end of each bolt or anchor distal from the portion of the bolt or anchor affixed to the ground or other structure is directed upward, away from, and perpendicular to the ground or fixed structure. The distal end of each bolt or anchor passes through a respective aperture 1410, which may be secured to the bolt or anchor via a nut and washer combination or other suitable fastener. Apertures 1410 may also be used to connect stairway supports 1400 to another component, such as a mobile kit, as described in more detail below with respect to FIGS. 29A and 29B.

Figure 15:
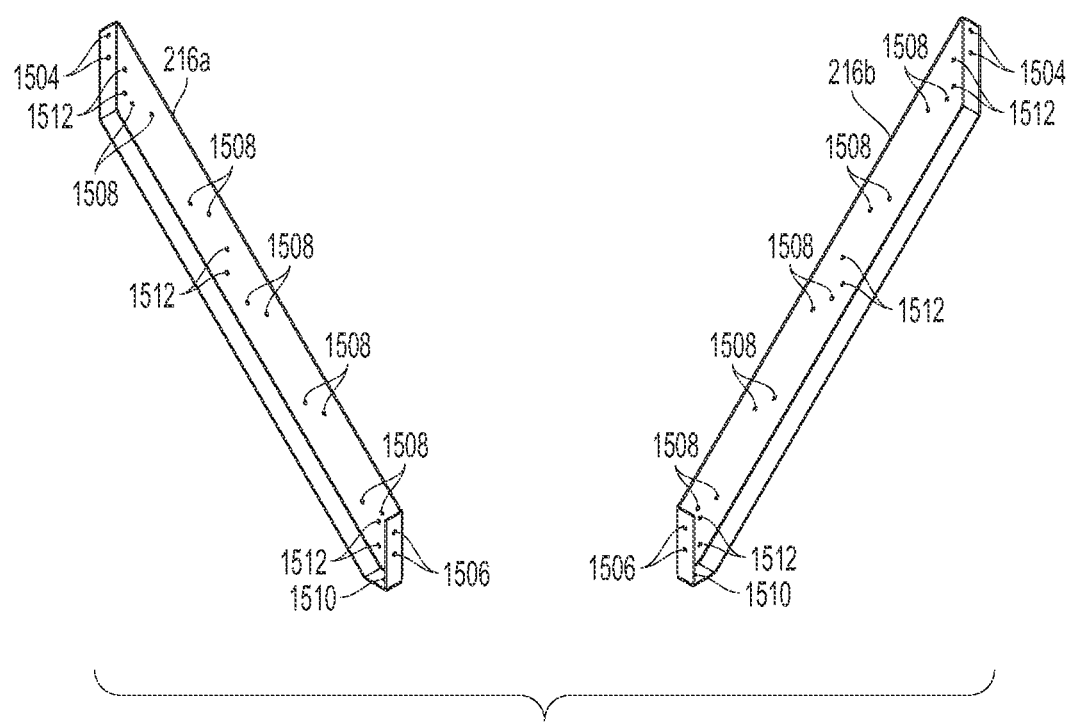
FIG. 15 is a perspective view of another exemplary pair of stairway supports for a platform system in accordance with an embodiment of the present invention.

Each of stairway supports 1400 includes a single pair of apertures 1408 configured to interconnect a single step. It should therefore be understood that stairway supports 1400 are configured to form a stairway comprising a single step and thus are relatively shorter in length than stairway supports 114, 216, and 306 described above with regard to FIGS. 1, 2, and 3, respectively. Similar to the explanations set forth above with respect to FIGS. 9, 10, 11, and 12 regarding the ability to extend the length of the stairway handrails to accommodate greater stairway lengths, however, the length of the stairway supports may be extended for the same reasons in a similar fashion. Referring to FIG. 15, for example, illustrates stairway supports 216 exhibiting lengths greater than that of stairway supports 1400 of FIG. 13. Each of stairway supports 216 defines five pairs of apertures 1508 in order to interconnect five steps, as illustrated in FIG. 2. Those skilled in the art should thus appreciate from the ensuing explanation that the present invention contemplates stairway supports of varying sizes in order to build stairways comprising a different number of steps.

Referring additionally to FIGS. 13 and 14, stairway supports 216 are formed in a manner similar to that described above with respect to the formation of stairway supports 1400. That is, single, continuous pieces of sheet metal are cut and folded to form each stairway support 216. Each continuous piece of sheet metal is cut to define apertures 1504, 1506, 1508, 1510, and 1512, which are similar in construction, function, and use to apertures 1404, 1406, 1408, 1410, and 1412, respectively. For example, apertures 1510 may be used to connect stairway supports 216 to the ground, another structure, or a mobile kit, similar to the operation of apertures 1410, as explained above.

In this embodiment, each of stairway supports 216 defines an extra pair of apertures 1512 in comparison to apertures 1412 defined by stairway supports 1400. It should be understood that the additional length of stairway supports 216 in comparison to supports 1400 necessitates the additional pair of apertures 1512 to enable supports 216 to connect to stairway handrails exhibiting extended lengths (and, thus, having an extra handrail portion), such as handrails 1100a and 218a described above with regard to FIGS. 11 and 12, respectively. Additionally, each stairway support 216 may define a third aperture 1504 below the two apertures 1504 illustrated in FIG. 15 in order to connect stairway supports exhibiting such a greater length to another component, such as platform 102 (FIGS. 1 through 4), as described in more detail below with respect to FIGS. 24A and 24C.

It should be understood by those of ordinary skill in the art that other stairway supports may be manufactured in a manner similar to that by which stairway supports 1400 and 216 are formed as described above. This is to accommodate for the desired height and length of any stairway of a platform system, such as stairways 104 and 302 (FIGS. 1 and 3, respectively) defined by stairway supports 114 and 306. That is, shorter or longer stairway supports may be formed to accommodate for a greater or lesser number of steps in a manner consistent with the above description without departing from the scope of the present invention.

Figure 16A:
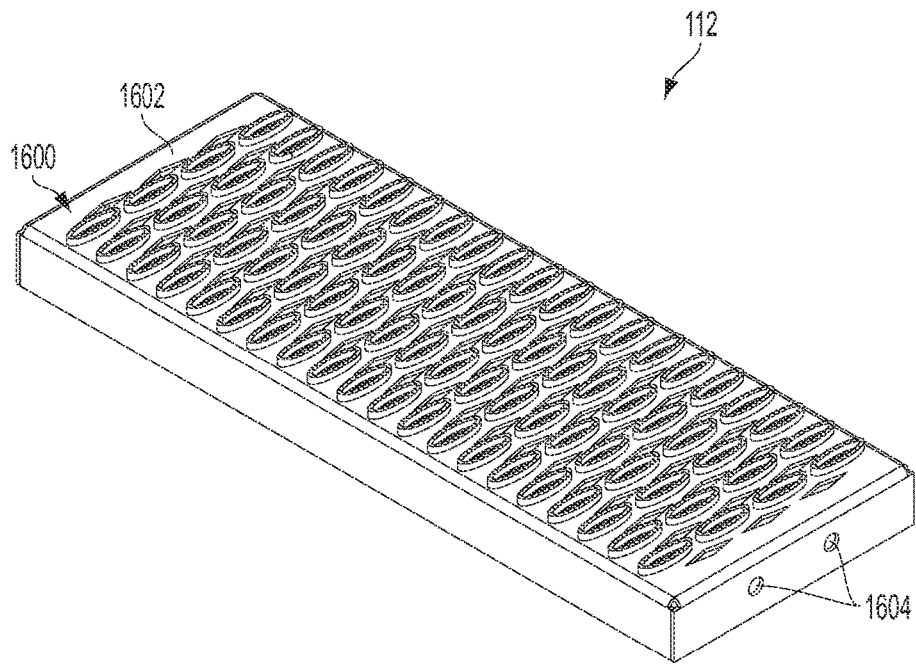
FIG. 16A is a perspective view of a step for a platform system in accordance with an embodiment of the present invention.
Figure 16B:
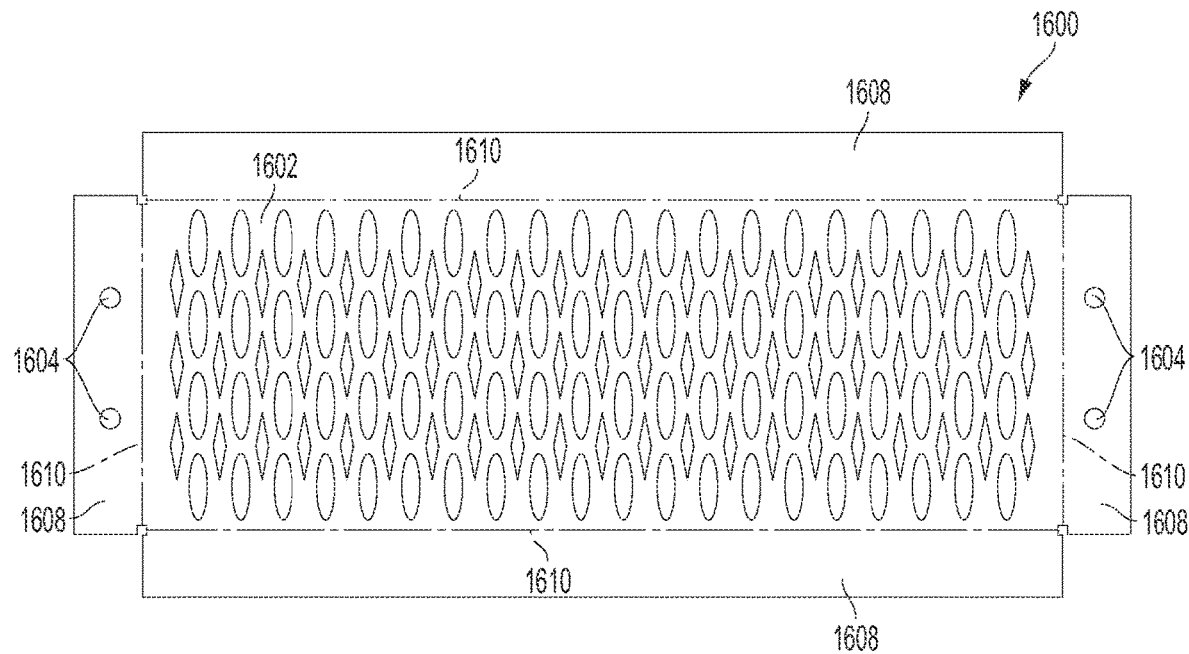
FIG. 16B is a top planar view of a continuous piece of sheet metal cut to form the step of FIG. 16A.

Those skilled in the art should appreciate that the above description provides the ability to manufacture, install, and use the same step and platform regardless of the length of a stairway of a platform system or the size of the platform system itself. For example, FIG. 16A is a perspective view of such a step 112 in accordance with an embodiment of the present invention. FIG. 16B is a top planar view of a single, continuous piece 1600 of sheet metal from which step 112 is formed. Referring to FIGS. 16A and 16B, single, continuous piece 1600 of sheet metal is cut to take the form illustrated in FIG. 16B and to define apertures 1604. A plurality of sides 1608 are folded down at approximately 90° with respect to an area 1602 at respective fold lines 1610. The manner by which apertures 1604 are used to connect step 112 between two stairway supports is described in more detail below with respect to FIGS. 23A, 23B, 24A, and 25A. It should be understood from the ensuing explanation that any number of steps 112 may be used to form a stairway depending on the desired height and length of the stairway.

Figure 17:
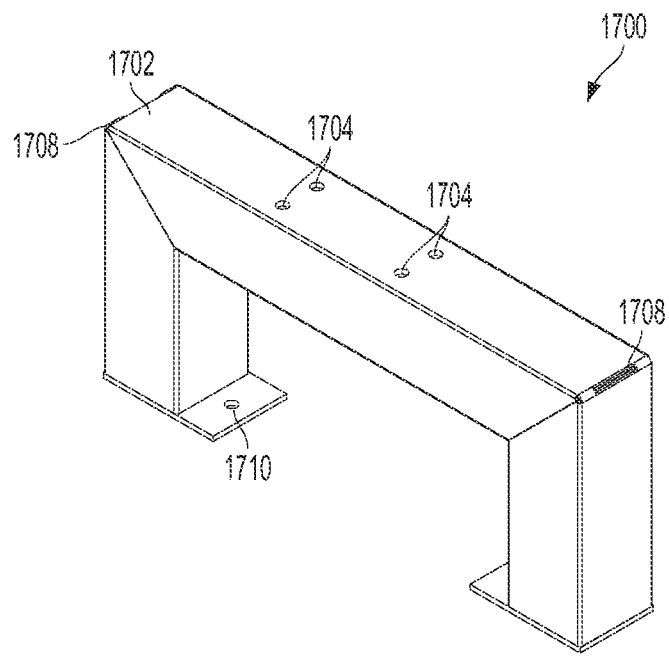
FIG. 17 is a perspective view of a stand for a platform system in accordance with an embodiment of the present invention.
Figure 18A:
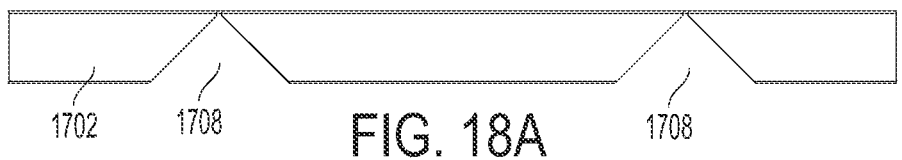
FIGS. 18A and 18B are side and top planar views, respectively, of a continuous piece of tubular metal cut to form the stand of FIG. 17.
Figure 18B:
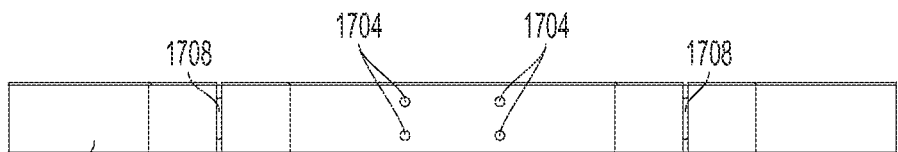

FIG. 17 is a perspective view of a stand 1700 formed from a single, continuous piece 1702 of tubular metal. FIGS. 18A and 18B are front and top elevation views, respectively, of continuous piece 1702 of tubular metal. Referring to FIGS. 17, 18A, and 18B, continuous piece 1702 of tubular metal is cut to define apertures 1704 and 1710 and to define areas 1708. Stand 1700 is formed in a manner similar to that described in the applications referenced above and specifically application Ser. No. 12/537,842. That is, continuous piece 1702 of tubular metal is then folded at areas 1708 in order to form stand 1700 as illustrated. Once folded, areas 1708 may be welded together if desired.

Stand 1700 may be used to support platform 102 (FIGS. 1 through 4) in a manner similar to that described above with respect to stands 210 of FIGS. 2 and 3. In one embodiment, this is accomplished by introducing threaded inserts into apertures 1704. A threaded bolt or other suitable fastener passes through the platform and into one of the threaded inserts located within the corresponding aperture 1704, as described in more detail below with respect to FIGS. 27A and 27B. Examples of suitable threaded inserts are those offered for sale by AVK Industrial Products mentioned above. Other suitable hardware, such as an anchor or a bolt, may be used to affix stand 1700 to the ground via apertures 1710 defined in the bottom surface of the stand in a manner similar to that described above with respect to stairway supports 1400 of FIGS. 13 and 14.

Figure 19:
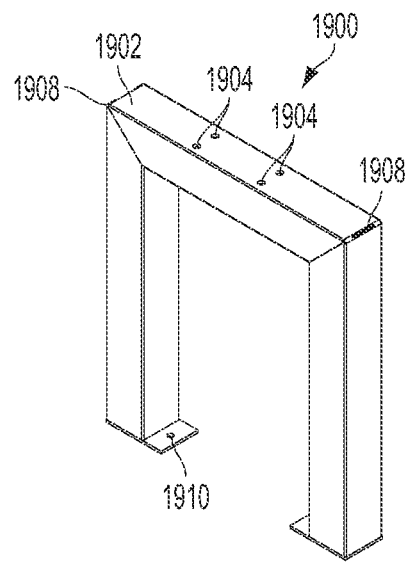
FIG. 19 is a perspective view of a stand for a platform system in accordance with an embodiment of the present invention.
Figure 20A:
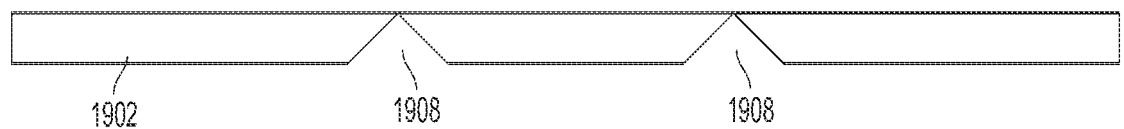
FIGS. 20A and 20B are side and top planar views, respectively, of a continuous piece of tubular metal cut to form the stand of FIG. 19.
Figure 20B:
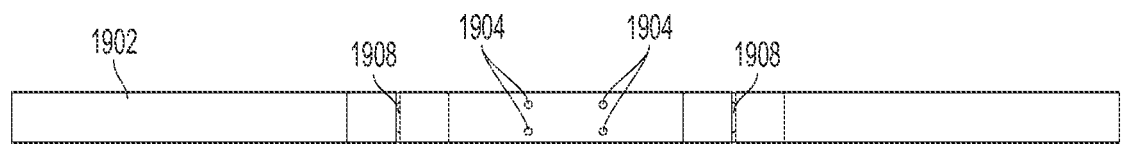

It should be understood that stand 1700 may be extended to accommodate for other heights at which the associated platform may be located. Referring additionally to FIGS. 19, 20A, and 20B, for example, a stand 1900 is illustrated exhibiting a height greater than that of stand 1700. Similarly, stand 1900 is formed from a single, continuous piece 1902 of tubular metal, which is cut to define apertures 1904 and 1910, as well as areas 1908. Stand 1900 is then formed in a manner similar to that described above with regard to stand 1700. That is, continuous piece 1902 of tubular metal is folded at approximately 90° at areas 1908. Similar to that described above with respect to apertures 1704 of FIG. 17, threshold inserts are placed in apertures 1904. Stand 1900 is otherwise constructed and may be utilized in a manner similar to the construction and use of stand 1700, as described in more detail below with respect to FIGS. 27A and 27B.

Figure 21:
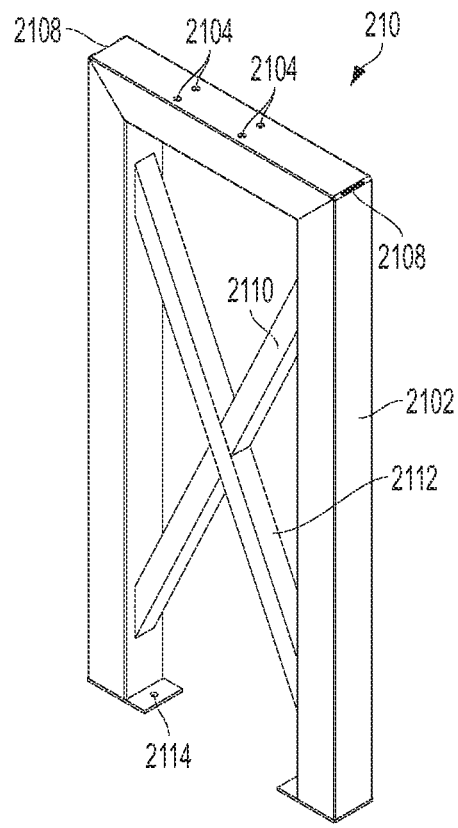
FIG. 21 is a perspective view of a stand that may be used in a platform system in accordance with an embodiment of the present invention.
Figure 22A:
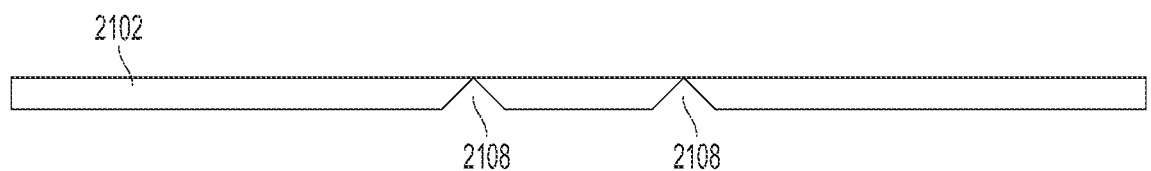
FIGS. 22A and 22B are side and top planar views, respectively, of a continuous piece of tubular metal cut to form the stand of FIG. 21.
Figure 22B:
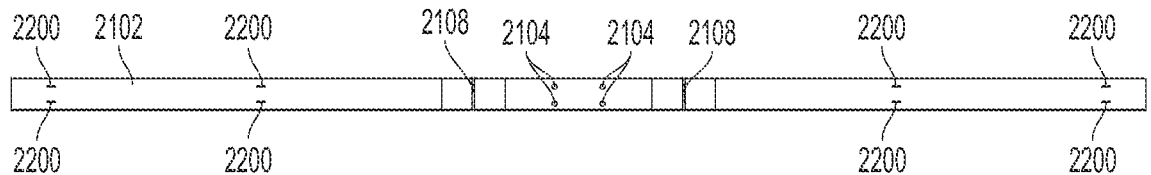

It should be further understood that even stand 1900 may not be of a height sufficient for all platform systems. Accordingly, the height of the stand may be increased to support platforms located at an even greater height, such as stand 210 described above with respect to FIGS. 2 and 3. However, depending on the stand's height it may require additional supports. FIG. 21, for example, illustrates stand 210 exhibiting a height greater than that of stands 1700 and 1900. Referring additionally to FIGS. 22A and 22B, stand 2100 comprises an outer rail 2102 and a pair of cross supports 2110 and 2112, each of which is formed from a single, continuous piece of metal, in this embodiment. The continuous piece of metal forming outer rail 2102 is cut to define apertures 2104 and 2114, slots 2200, and areas 2108.

In one embodiment, the tubular pieces of metal used to form cross supports 2110 and 2112 are cut so that each end of the cross supports define a pair of tabs in a manner similar to that described in application Ser. No. 12/537,842 referenced above. Slots 2200 are relatively small, slit-shaped apertures configured to receive these tabs on the ends of cross supports 2110 and 2112 when outer rail 2102 is folded at areas 2108. That is, as outer rail 2102 is folded, the pair of tabs defined by each end of cross supports 2110 and 2112 is inserted into a respective pair of slots 2200. The intersections of the tabs and slots may be welded if desired. Outer rail 2102 is otherwise formed in a manner similar to that described above with regard to stands 1700 (FIG. 17) and 1900 (FIG. 19), as well as that described in the applications incorporated by reference above. Cross support 2112 is also cut to define an aperture in the middle of the support configured to receive cross support 2110, as illustrated in FIG. 21. The attachment of a platform to stand 210 is described in more detail below with respect to FIGS. 27A and 27B. Those skilled in the art should thus appreciate that stands of other heights may be constructed and used in a similar manner.

Figure 23A:
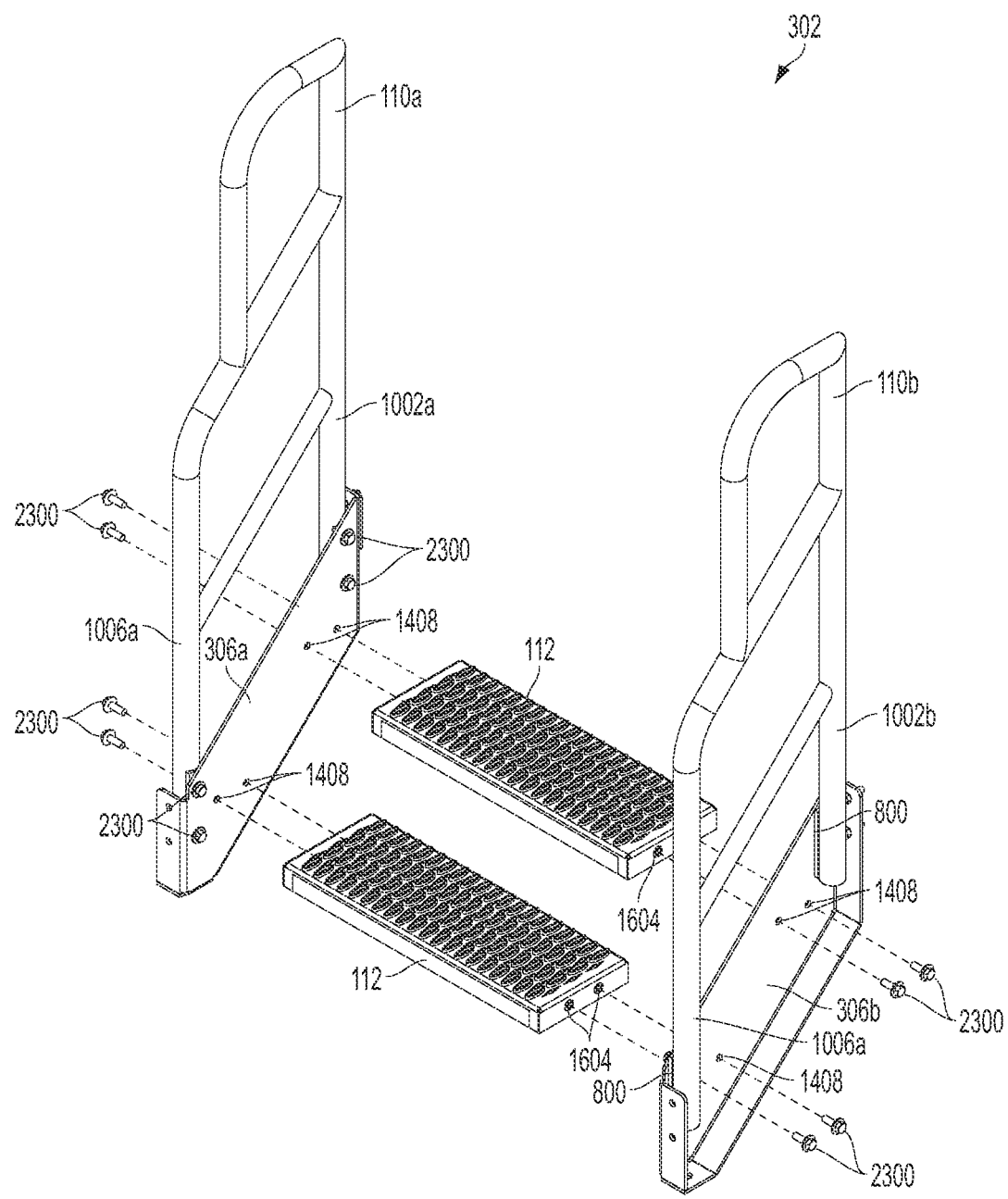
FIGS. 23A and 23B illustrate an exemplary process for forming a stairway of a platform system in accordance with an embodiment of the present invention.
Figure 23B:
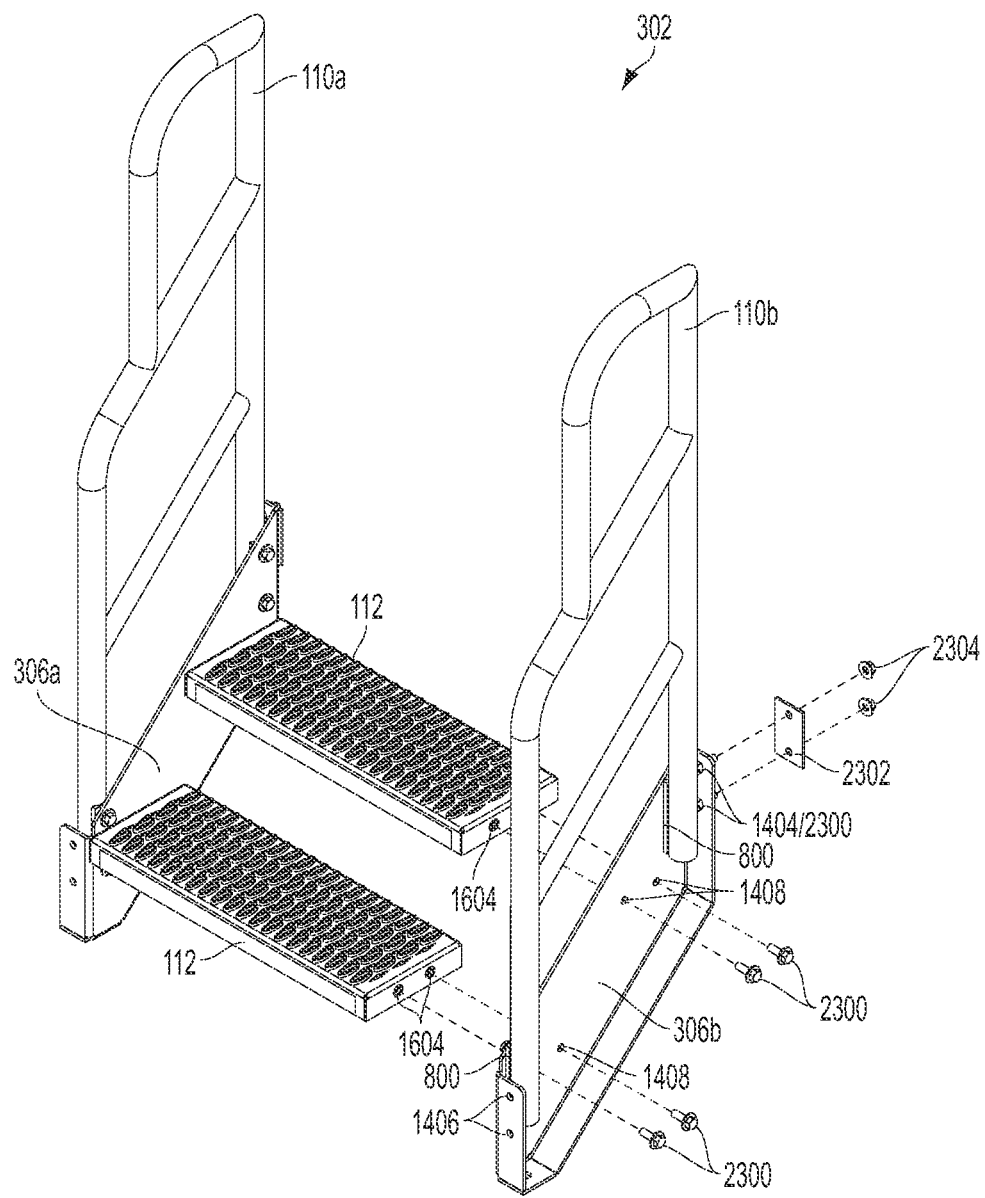

FIGS. 23A and 23B illustrate a process for forming stairway 302 in accordance with an embodiment of the present invention. As explained above with reference to FIG. 3, stairway 302 comprises two handrails 110, two stairway supports 306, and two steps 112. While the ensuing explanation is directed to the specific components illustrated in FIGS. 23A and 23B, it should be understood that it is also applicable to components and, thus, stairways, of sizes and dimensions different than those illustrated. That is, the formation of stairways for platform systems as described herein is accomplished in a manner similar to that described with respect to FIGS. 23A and 23B regardless of the number of steps and the relatively lesser or greater dimensions of the stairway as compared to stairway 302. Those skilled in the art should thus appreciate that stairway handrails are connected to stairway supports of comparable lengths and interconnected with an analogous number of steps in a manner similar to that described below.

Referring additionally to FIGS. 8, 10, 13, and 14, handrail washers 800 are placed between stairway supports 306 and each portion 1002 and 1004 of handrails 110 in order to connect the handrails to the stairway supports in one embodiment. As a result, each of apertures 1412 is coaxially aligned with a respective aperture 804 and 1008. In this embodiment, the cylindrical portion of a bolt and washer combination 2300 is passed through each set of aligned apertures 804, 1008, and 1412 and rotated into the threaded inserts included within apertures 1008. Bolt and washer combinations 2300 are tightened into the threaded inserts in order to connect each handrail 110 to the respective stairway support 306. Apertures 1410 may be used to secure stairway 302 to a surface, such as the ground, in a manner described above with respect to FIGS. 13 and 14.

Referring again to FIGS. 23A and 23B, each of apertures 1408 of stairway support 306b is coaxially aligned with a corresponding aperture 1604 on the right side of steps 112 in order to connect the steps to stairway support 306b. Likewise, each of apertures 1408 of stairway support 306a is coaxially aligned with a corresponding aperture 1604 on the left side of steps 112. The cylindrical portion of each threaded bolt and washer combination 2300 is inserted through a corresponding pair of aligned apertures 1408 and 1604. In one embodiment, a nut is tightened on the end of each bolt and washer combination 2300 that passes through apertures 1408 and 1604 in order to fasten steps 112 to stairway supports 306. In another embodiment, a threaded insert similar to those described above is inserted into each aperture 1604 of steps 112. In such an embodiment, each bolt and washer combination is introduced to the respective threaded insert and rotated in order to connect the steps to the stairway supports.

Figure 23C:
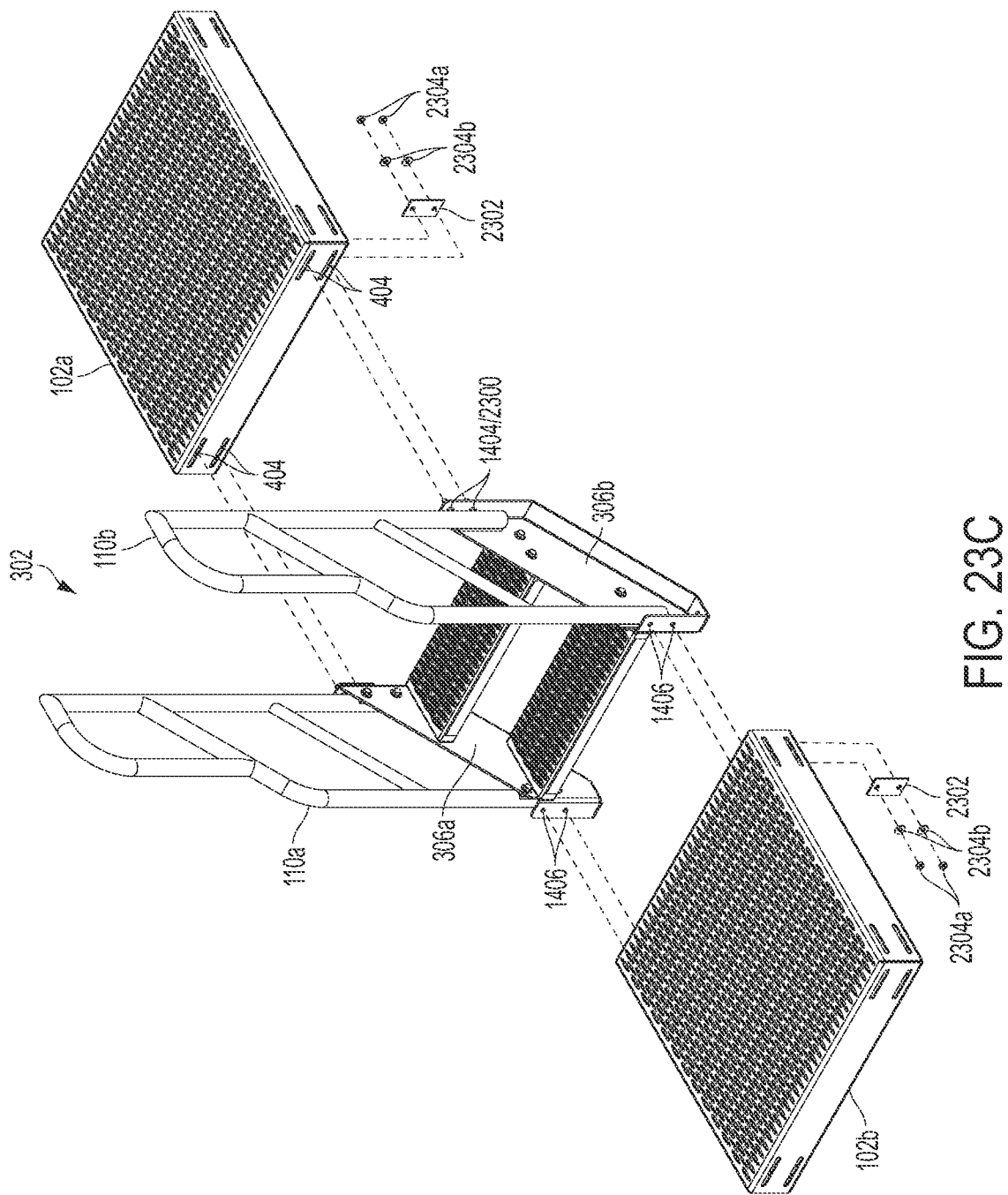
FIG. 23C illustrates an exemplary process for connecting the stairway of FIG. 23A to other components of a platform system in accordance with an embodiment of the present invention.

FIGS. 23B and 23C illustrate a process for connecting stairway 302 to one or more platforms in accordance with an embodiment of the present invention. In order to connect the elevated side of stairway 302 to platform 102a, a side of the platform is placed adjacent stairway supports 306 so that each aperture 1404 of the supports coaxially aligns with a respective aperture 404 of the platform. A backing plate 2302 defining a pair of apertures is placed adjacent the surface of the side of the platform in contact with stairway supports 306 opposite the surface in contact with the supports so that each aperture of the backing plate coaxially aligns with a respective pair of aligned apertures 404 and 1404. The cylindrical end of threaded bolt and washer combination 2300 is passed through each set of the aligned apertures as illustrated. Platform 102a, along with backing plate 2302, is secured to stairway supports 306 by attaching a washer and nut combination 2304 to the cylindrical end of each bolt and washer combination and tightened. That is, a washer 2304b is placed over the cylindrical end of the bolt passed through the aligned apertures and adjacent to backing plate 2302, and a nut 2304a is rotated about the bolt's end. As a result, platform 102a is connected to stairway supports 306. While only one set of backing plate 2302 and washer and nut combination 2304 is illustrated in FIG. 23C as connecting platform 102a to stairway support 306b, it should be understood that another backing plate and another washer and nut combination are used to connect platform 102a to stairway support 306a. It should also be understood that, while FIG. 23C illustrates connecting stairway 302 comprising two steps 112 to platforms 102, the description is similarly applicable to the process of connecting stairways exhibiting both lesser and greater numbers of steps to the platforms.

As illustrated in FIG. 23C, a second platform 102b may be connected to the side of stairway 302 opposite the side connected to platform 102a. This may be accomplished in a manner similar to that described above with respect to platform 102a. That is, each aperture 1406 of stairway supports 306 is coaxially aligned with a corresponding aperture 404 of platform 102b and a corresponding aperture defined by backing plates 2302. The cylindrical end of threaded bolt and washer combination 2300 is passed through each set of aligned apertures 1406, 404, and those defined by the backing plate. Platform 102b, along with backing plate 2032, is secured to stairway supports 306 via a washer and nut combination 2304 in the manner described above. While only one backing plate 2302 and one washer and nut combination 2304 are illustrated in FIG. 23C connecting platform 102b to stairway support 306b, it should be understood that another backing plate and another washer and nut combination are used to connect platform 102b to stairway support 306a.

Figure 23D:
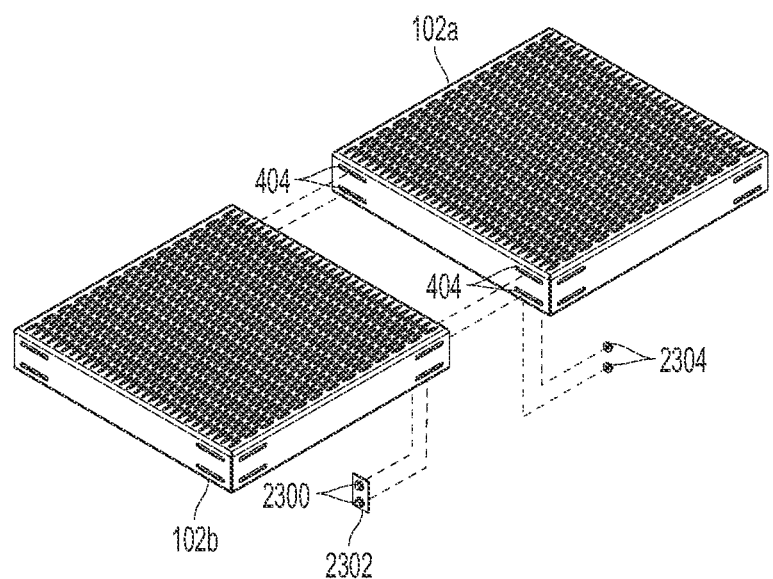
FIGS. 23D and 23E illustrate exemplary processes for connecting multiple platforms of a platform system together in accordance with various embodiments of the present invention.
Figure 23E:
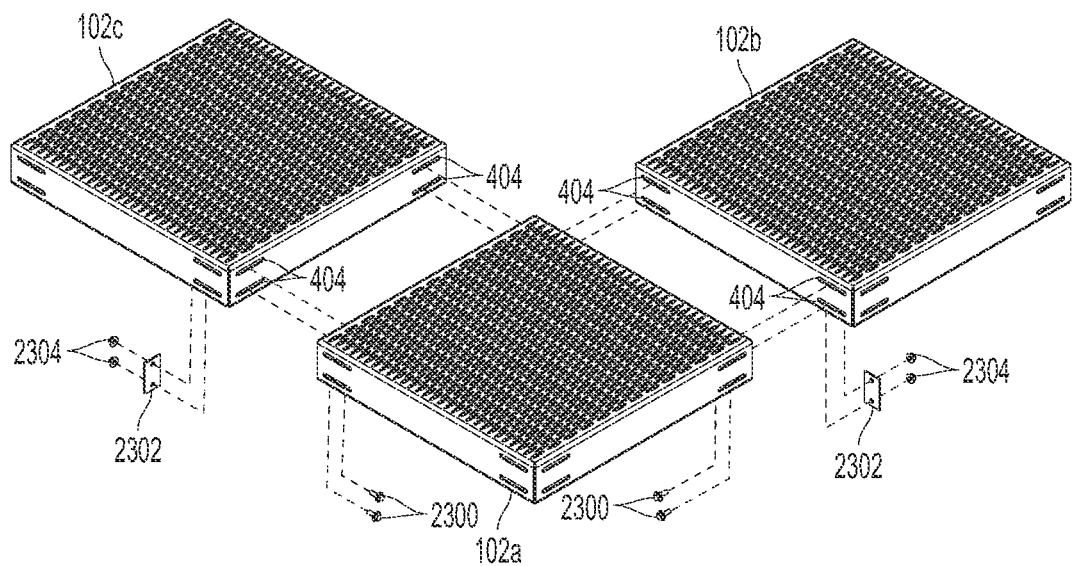

FIGS. 23D and 23E illustrate exemplary processes for connecting one or more platforms together. In one embodiment, with reference to FIG. 23D, a side of platform 102a is placed adjacent a side of platform 102b so that each apertures 404 defined by the side of one platform align with a respective aperture 404 defined by the side of the other platform. Platforms 102a and 102b are connected in a manner similar to that described above with respect to platform 102a and supports 306 of FIG. 23C. That is backing plates 2302 are placed adjacent an inside surface of the side of one platform in contact with the side of the other platform. In this example, backing plate 2302 is placed adjacent the inner surface of the side of platform 102b in contact with the side of platform 102a. As a result, each aperture of backing plates 2302 is coaxially aligned with a respective coaxially aligned pair of apertures 404 of the two platforms. The cylindrical end of bolt and washer combination 2300 is passed through each coaxially aligned set of apertures. Washer and nut combinations 2304 are then used to secure platforms 102a and 102b together by attaching to the cylindrical end of each bolt.

In another embodiment, with reference to FIG. 23E, platform 102a may be connected to platform 102b on one side and platform 102c on another. Platform 102a is connected to platforms 102b and 102c in the manner described above with respect to FIG. 23D. That is, platforms 102b and 102c are placed adjacent to different sides of platform 102a so that apertures 404 defined by the adjacent sides of the platforms are coaxially aligned. Backing plates 2302, bolt and washer combinations 2300 and washer and nut combinations 2304 are used to secure the platforms together, as illustrated, in a manner similar to that described above. It should be understood from the foregoing explanation that any number, configuration, and arrangement of platforms 102 may be created by the process of connecting the platforms together described above.

Figure 24A:
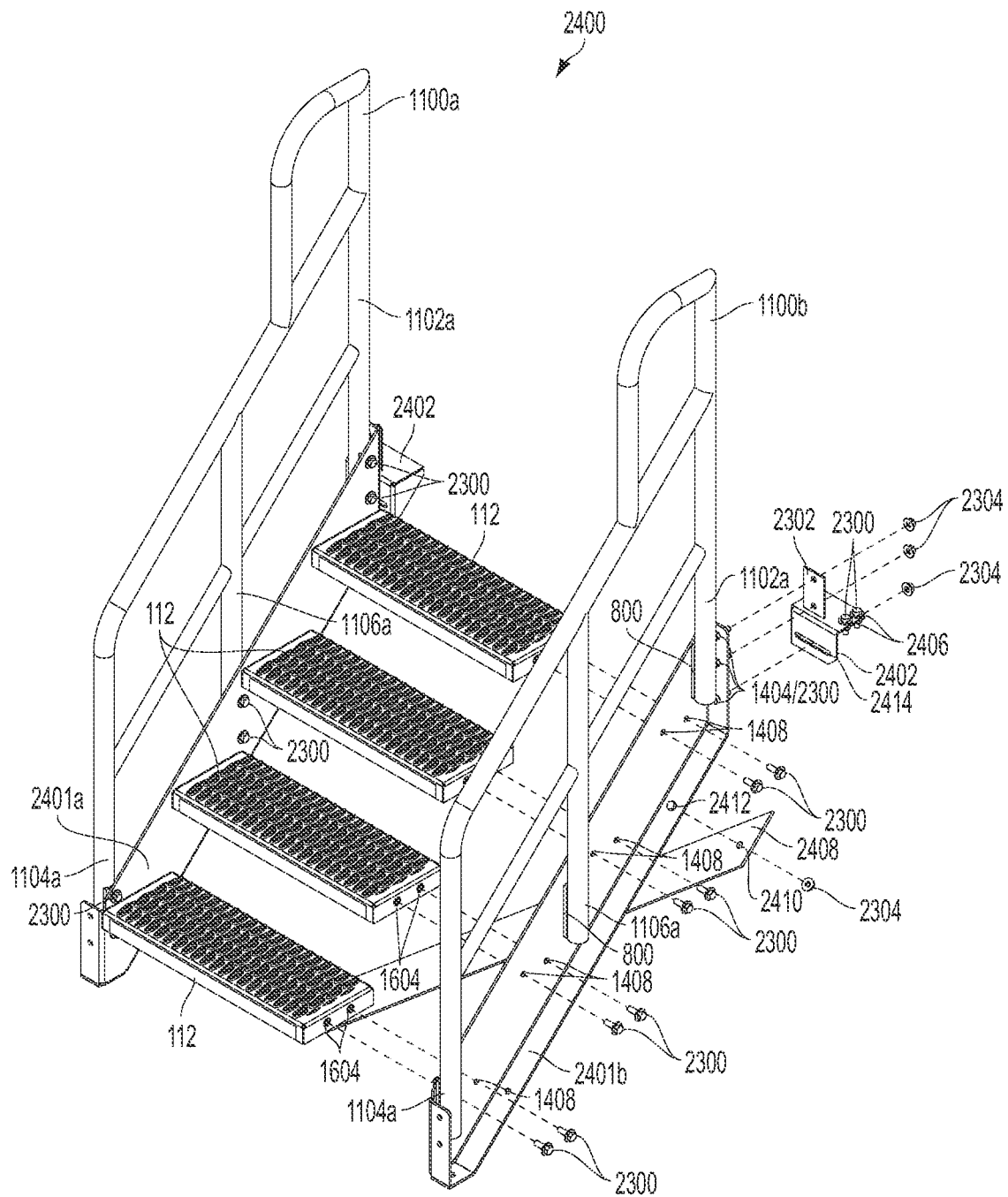
FIGS. 24A and 24B illustrate an exemplary process for forming a stairway of a platform system in accordance with an embodiment of the present invention.
Figure 24B:
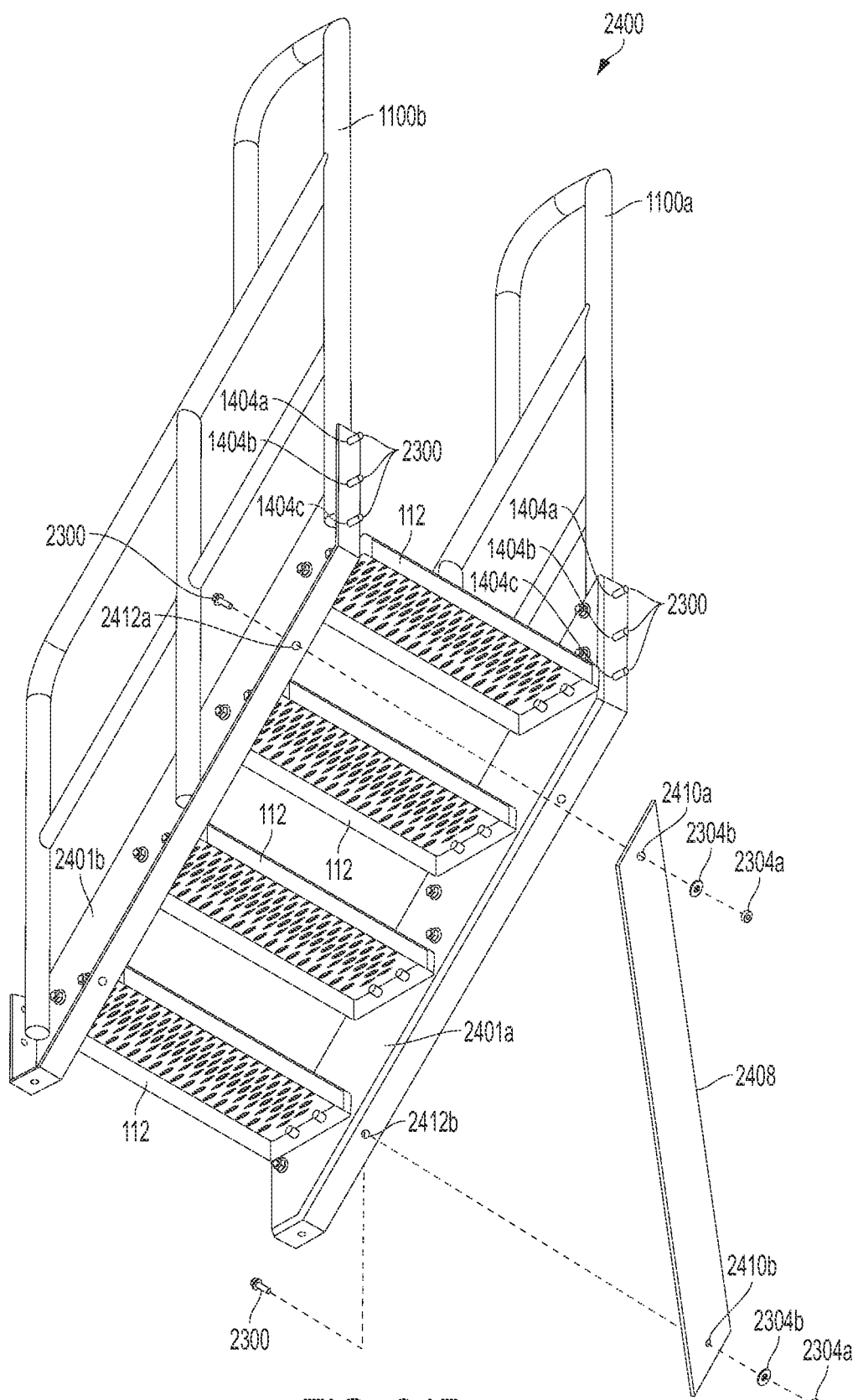

FIGS. 24A and 24B illustrate an exemplary process for building another stairway 2400 of a platform system exhibiting a length greater than that of stairway 302 described above. In this embodiment, stairway 2400 comprises two handrails 1100, two stairway supports 2401, and four steps 112. Steps 112 are connected to stairway supports 2401 (designated 2401a and 2401b) in a manner similar to that described above with respect to FIGS. 23A and 23B. That is, threaded bolt and washer combinations 2300 are passed through coaxially aligned apertures 1408 and 1604 in order to connect steps 112 to stairway supports 2401. The threaded bolt and washer combinations are secured in place via washer and nut combinations 2304 in one embodiment and via threaded inserts within apertures 1604 in another.

Handrails 1100 are likewise connected to stairways supporting 2401 in a manner similar to that described above with reference to FIGS. 23A and 23B. That is, handrail washers 800 are placed between stairway supports 2401 and portions 1102, 1104, and 1106 of handrails 1100. Threaded bolt and washer combinations 2300 are passed through coaxially aligned apertures 1408 of stairway supports 2401, 804 (FIG. 8) of handrail washers 800, and 1114 (FIG. 11) of stairway handrails 1100. The threaded bolt and washer combinations are then rotated into threaded inserts included within apertures 1114 in order to secure the stairway washers, handrails, and supports together.

Depending on the length of the stairway, additional support may be provided by one or more cross supports connecting the stairway supports underneath the steps. In the presently described embodiment, such a cross support 2408 is cut from a single, continuous piece of sheet metal into the shape illustrated in FIGS. 24A and 24B. The piece of sheet metal is also cut to define a pair of apertures 2410 on opposite ends of cross support 2408 as shown. Stairway supports 2401 are also cut to define apertures 2412 that correspond to apertures 2410 when cross beam 2408 is placed across the underside of stairway 2400 as illustrated particularly with respect to FIG. 24B. That is, aperture 2410a coaxially aligns with aperture 2412a, while aperture 2410b coaxially aligns with aperture 2412b. Threaded bolt and washer combinations 2300 are inserted through aligned apertures 2410 and 2412 and secured in place via respective washer and nut combinations 2304. It should be understood that additional cross supports may be necessary to support stairways exhibiting lengths greater than that of stairway 2400, examples of which are described in more detail below with respect to FIGS. 25A and 25B.

Figure 24C:
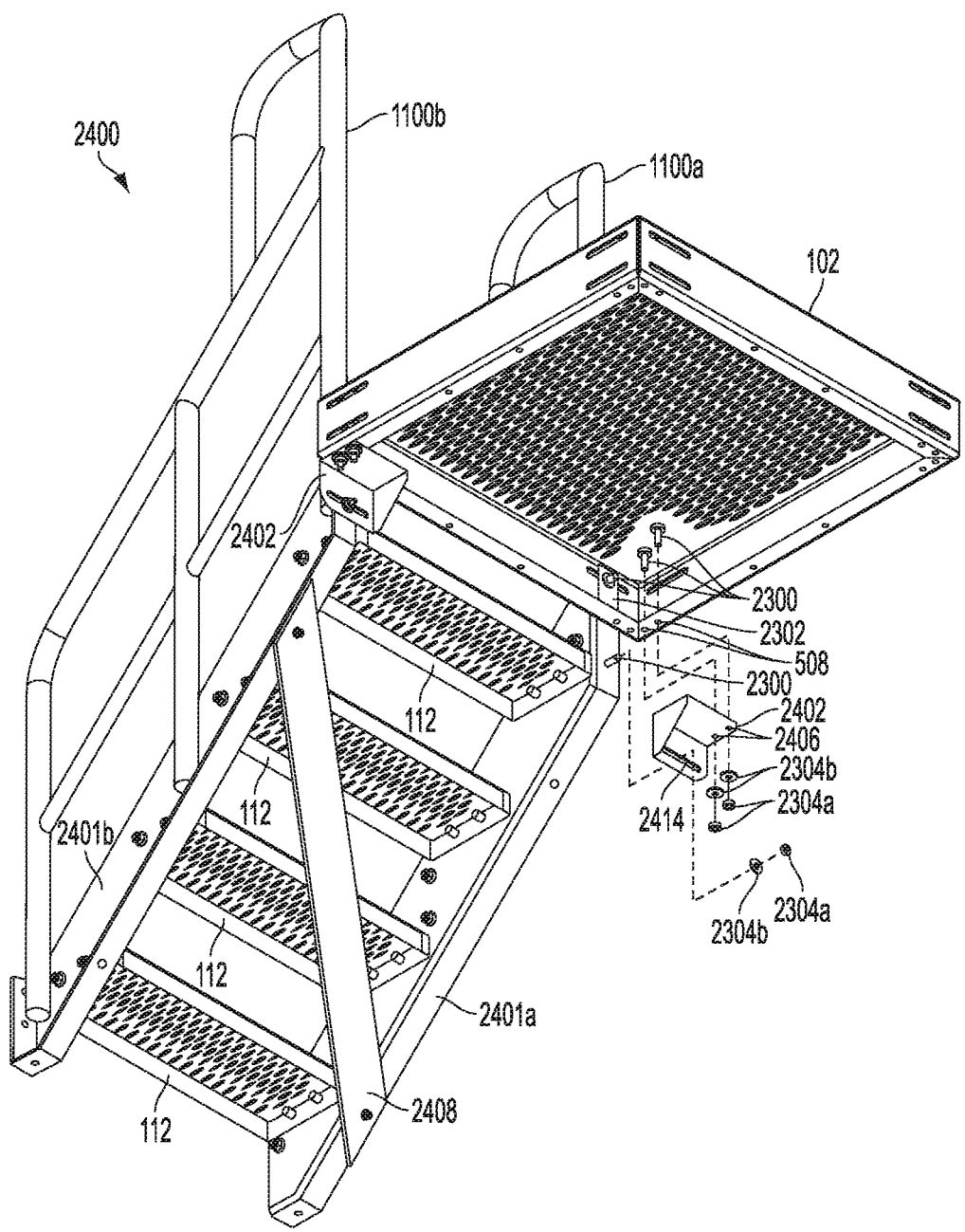
FIG. 24C illustrates an exemplary process for connecting the stairway of FIGS. 24A and 24B to other components of a platform system in accordance with an embodiment of the present invention.

FIGS. 24A, 24B, and 24C illustrate a process for connecting stairway 2400 to platform 102 in accordance with another embodiment of the present invention. In this embodiment, a pair of gussets 2402 is used in combination with a pair of backing plates 2302 in order to connect the stairway to the platform. In this embodiment, a horizontal surface of gussets 2402 defines a pair of apertures 2406, and a vertical surface defines a slot 2414.

Platform 102 is first connected to stairway supports 2401 in a manner similar to that described above with respect to platform 102a and supports 306 of FIG. 23C. That is, threaded bolt and washer combinations 2300 are passed through apertures 1404a and 1404b, corresponding apertures 404 (FIG. 4), and the respective apertures defined by backing plate 2302. Washer and nut combinations 2304 are tightened on the bolt in order to secure the platform to the stairway supports.

Gussets 2402 are then placed underneath platform 102 so that each aperture 2406 defined by the gussets coaxially aligns with a respective aperture 508 of the platform. The cylindrical end of threaded bolt and washer combination 2300 is passed through each pair of aligned apertures 2406 and 508 and secured in place via washer and nut combination 2304.

In the presently-described embodiment, the portions of stairway supports 2401 in contact with platform 102 are cut to define a third aperture 1404c below apertures 1404a and 1404b in a manner similar to that described above with respect to FIG. 15. Gussets 2402 are located so that each aperture 1404c aligns with a respective slot 2414 of each gusset. The cylindrical end of threaded bolt and washer combination 2300 is inserted through each aligned pair of additional aperture 1404c and slot 2414 and secured in place by washer and nut combination 2304. As a result, platform 102 is secured to stairway 2400 in this manner.

Figure 25A:
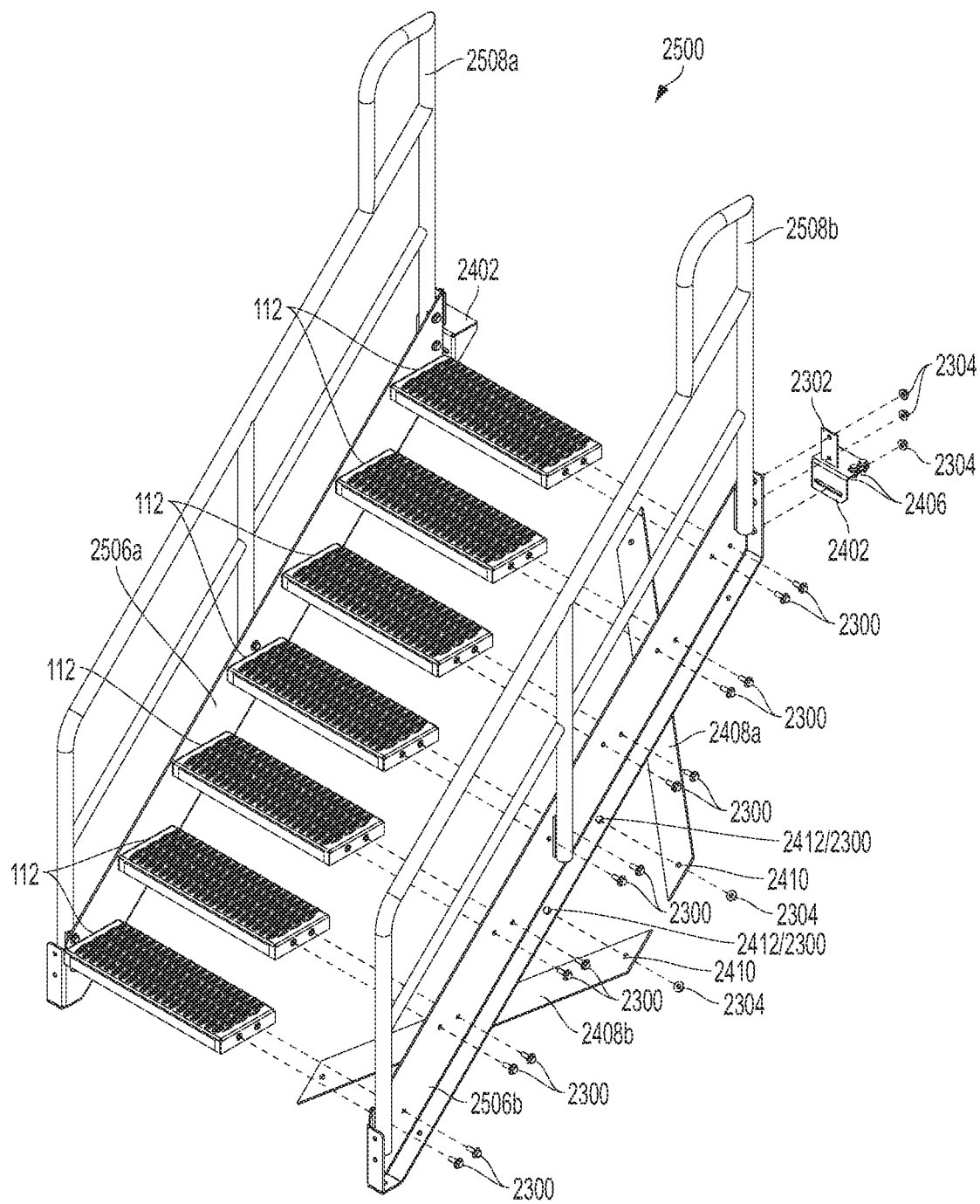
FIG. 25A illustrates an exemplary process for forming a stairway of a platform system in accordance with an embodiment of the present invention.
Figure 25B:
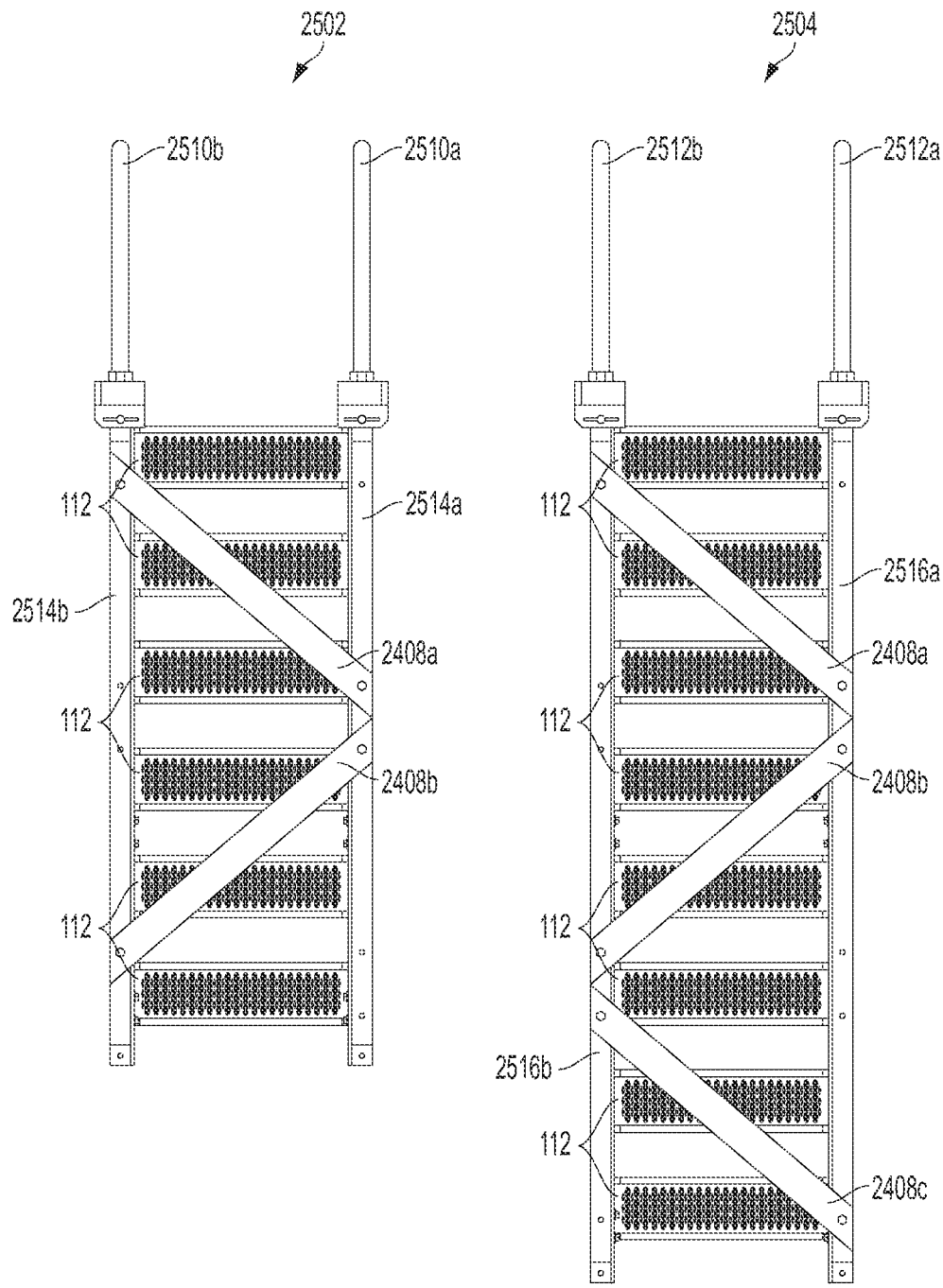
FIG. 25B is a bottom view of exemplary stairways for a platform system in accordance with various embodiments of the present invention.

It should be understood by those skilled in the art that the above description provides several examples of how to construct and arrange platform systems of varying shapes, sizes, and heights using interchangeable components. Those skilled in the art should appreciate that yet more shapes, sizes, heights, and configurations of platform systems are contemplated by the present invention. For example, FIGS. 25A and 25B illustrate stairways 2500, 2502, and 2504 comprising differing numbers of steps 112 and exhibiting varying heights. For example, stairway 2500 comprises stairway supports 2506 and handrails 2508 of different lengths than the stairway supports and handrails described above. Likewise, stairway 2502 includes stairway handrails 2510 and supports 2514, and stairway 2504 includes stairway handrails 2512 and supports 2516 that differ in size and length as compared to the stairway handrails and supports described above.

Stairways 2500 and 2502 include a second cross support 2408b in addition to cross support 2408a to provide additional stability to the stairways. Due to its relatively greater length, stairway 2504 includes a third cross support 2408c in addition to cross supports 2408a and 2408b. Stairways 2500, 2502, and 2504 are constructed and configured to connect to other components of a platform system in manners similar to that described above with respect to FIGS. 23A through 24C.

Figure 26:
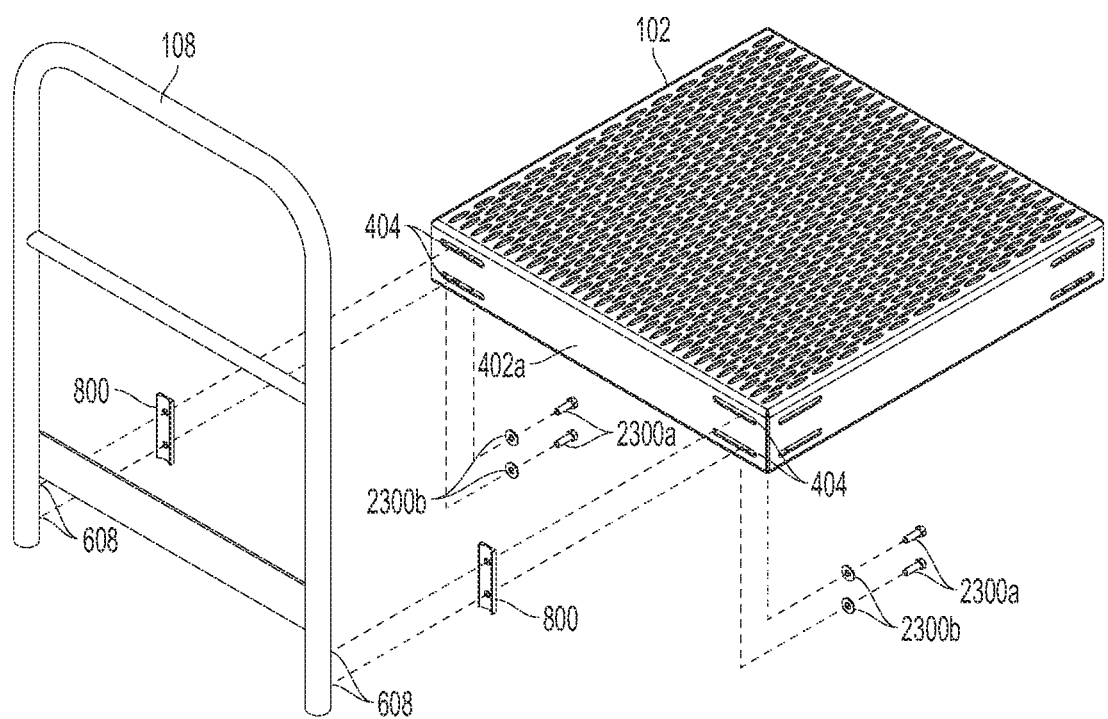
FIG. 26 illustrates an exemplary process for connecting the platform handrail of FIG. 6 to the platform of FIG. 4 in accordance with an embodiment of the present invention.

FIG. 26 illustrates an exemplary process for connecting handrail 108 to platform 102. In this embodiment, handrail washers 800 are placed between platform 102 and handrail 108 so that the washers' concave surfaces are in contact with the handrail's legs and the flat surfaces are in contact with side 402a of platform 102. As a result, each aperture 804 (FIG. 8) defined by washers 800 are coaxially aligned with a respective aperture 608 and a respective aperture 404. Washers 2300b are placed adjacent each aperture 404 of the inner surface of side 402a opposite the outer surface that is in contact with handrail washers 800. Each washer 2300b is placed so that the aperture defined by the washer also coaxially aligns with each aligned set of apertures 404, 804 (FIG. 8), and 608. Threaded bolts 2300a are inserted into each aligned set of apertures and rotated into the threaded insert located within aperture 608 thereby securing platform 102 to handrail 108.

Figure 27A:
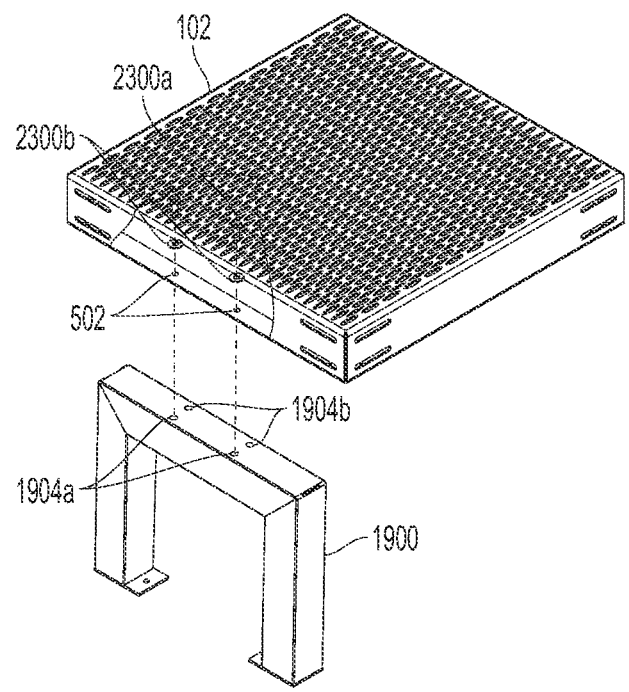
FIG. 27A illustrates an exemplary process for connecting the platform of FIG. 4 to the stand of FIG. 19 in accordance with an embodiment of the present invention.

FIG. 27A illustrates an exemplary process for connecting platform 102 to stand 1900. In this embodiment, platform 102 is positioned on top of stand 1900 so that a pair of apertures 502 of the platform coaxially aligns with a pair of apertures 1904a of the stand. Two washers 2300b are placed over apertures 502 so that each washer aligns with a respective aligned pair of an aperture 502 and an aperture 1904a. Threaded bolts 2300a are then passed through each aligned set of washer 2300b, aperture 502, and aperture 1904a. Threaded bolts 2300a are then tightened into the respective threaded inserts located within apertures 1904a. It should be understood that platform 102 may be connected to stands of other heights in a manner similar to that described above.

Figure 27B:
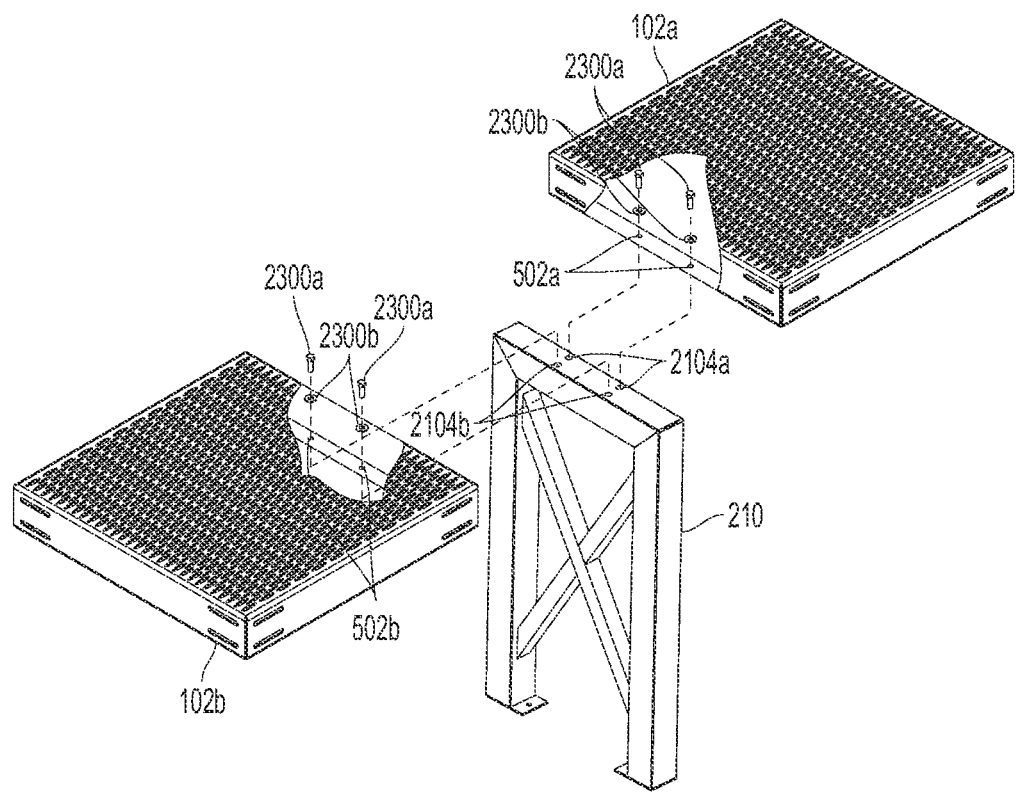
FIG. 27B illustrates an exemplary process for connecting multiple platforms to the stand of FIG. 21 in accordance with an embodiment of the present invention.

FIG. 27B illustrates an exemplary process for connecting multiple platforms 102 to stand 210. In this embodiment, platform 102a is positioned on top of stand 210 so that a pair of apertures 502a of the platform coaxially aligns with a pair of apertures 2104a of the stand. Platform 102b is positioned on top of stand 210 in a similar fashion so that a pair of apertures 502b of the platform coaxially aligns with a pair of apertures 2104b of the stand. Washers 2300b are placed over apertures 502 so that each washer aligns with a respective pair of an aperture 502 and an aperture 1904. Threaded bolts 2300a are then passed through each aligned washer 2300b, aperture 504, and aperture 2104. The threaded bolts are then tightened into the threaded inserts located within apertures 2104.

Those skilled in the art should appreciate from the above description that the stands described herein may be used to support the connection between two adjacent platforms. Although not illustrated, it should be understood that the adjacent platforms may be connected to one another in the manner described above with respect to FIGS. 23D and 23E. It should also be understood that the two platforms may be connected to a stand of a different height than that of stand 210 in a manner similar to that described above.

Those skilled in the art should also appreciate that the above description discloses platform systems comprising a platform that allows various components to be interchangeably connected to any side of the platform. It should be understood that other, different components may be designed for use with the platform systems described herein that also may be interchangeably connected to the platform or other components of the platform systems. For instance, FIGS. 28A, 28Bm and 28C illustrate a ladder component and FIGS. 29A and 29B illustrate a pair of mobile units that may be used with the platform systems described herein as explained in further detail below.

Figure 28A:
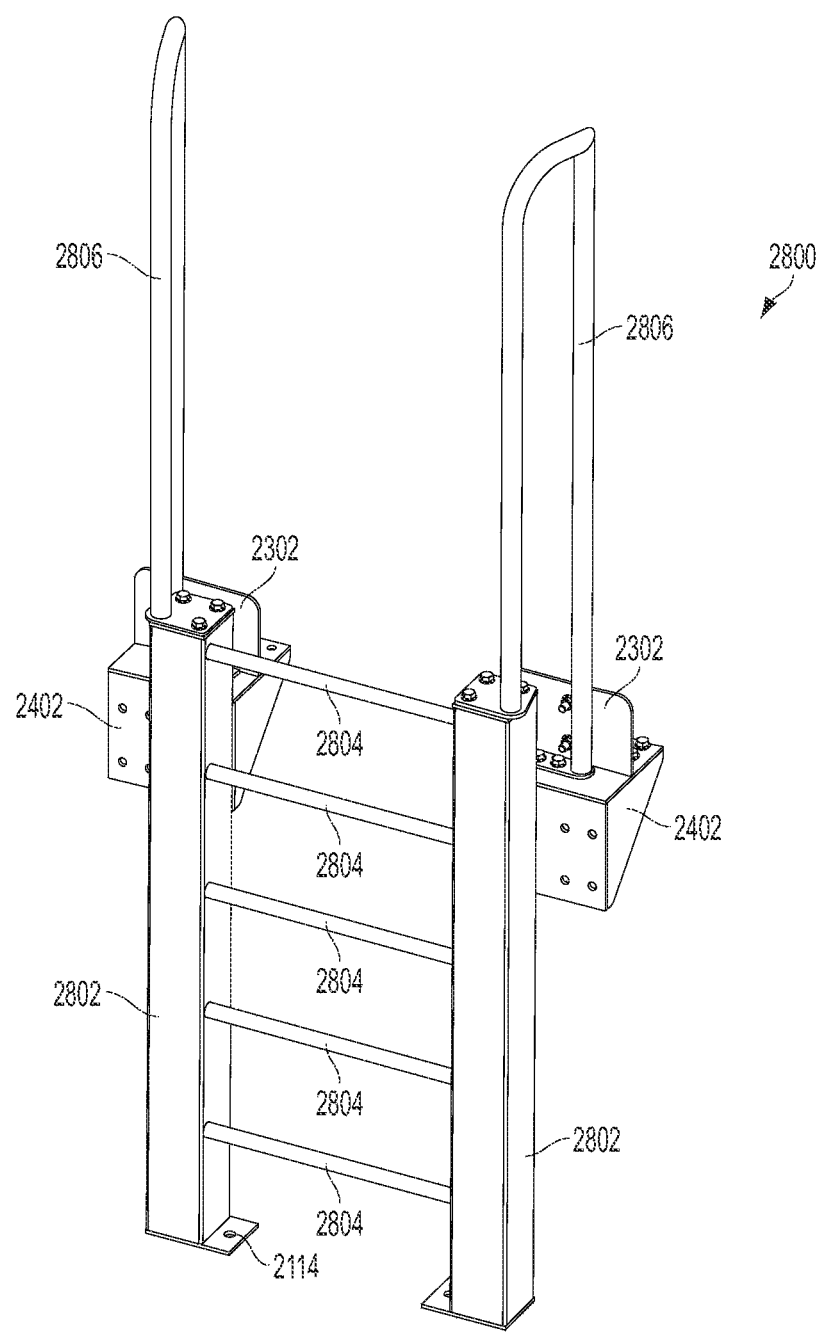
FIG. 28A is a perspective view of a ladder component for a platform system in accordance with an embodiment of the present invention.
Figure 28B:
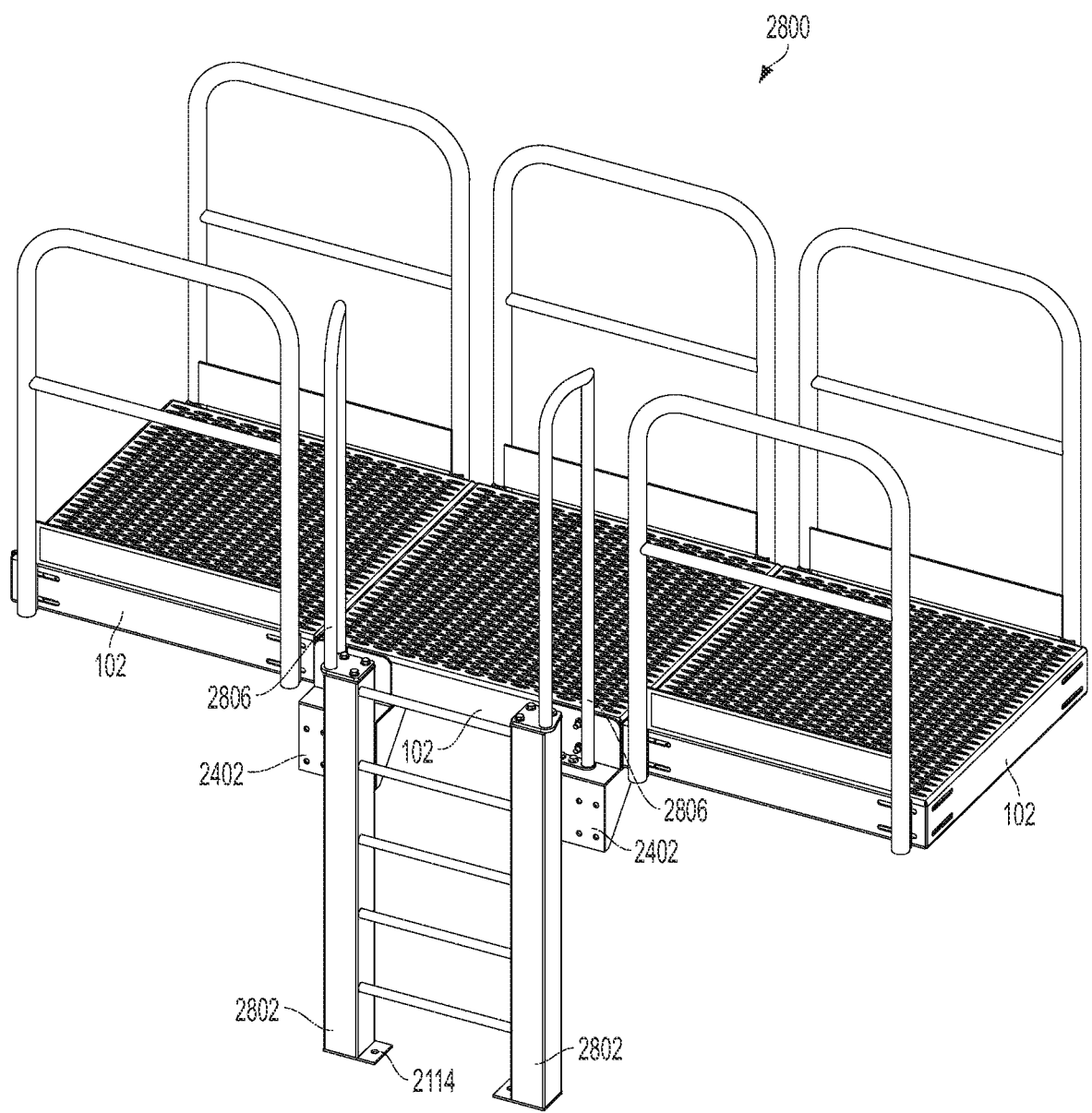
FIGS. 28B and 28C are perspective views of the ladder component of FIG. 28A connected to other components of a platform system in accordance with embodiments of the present invention.
Figure 28C:
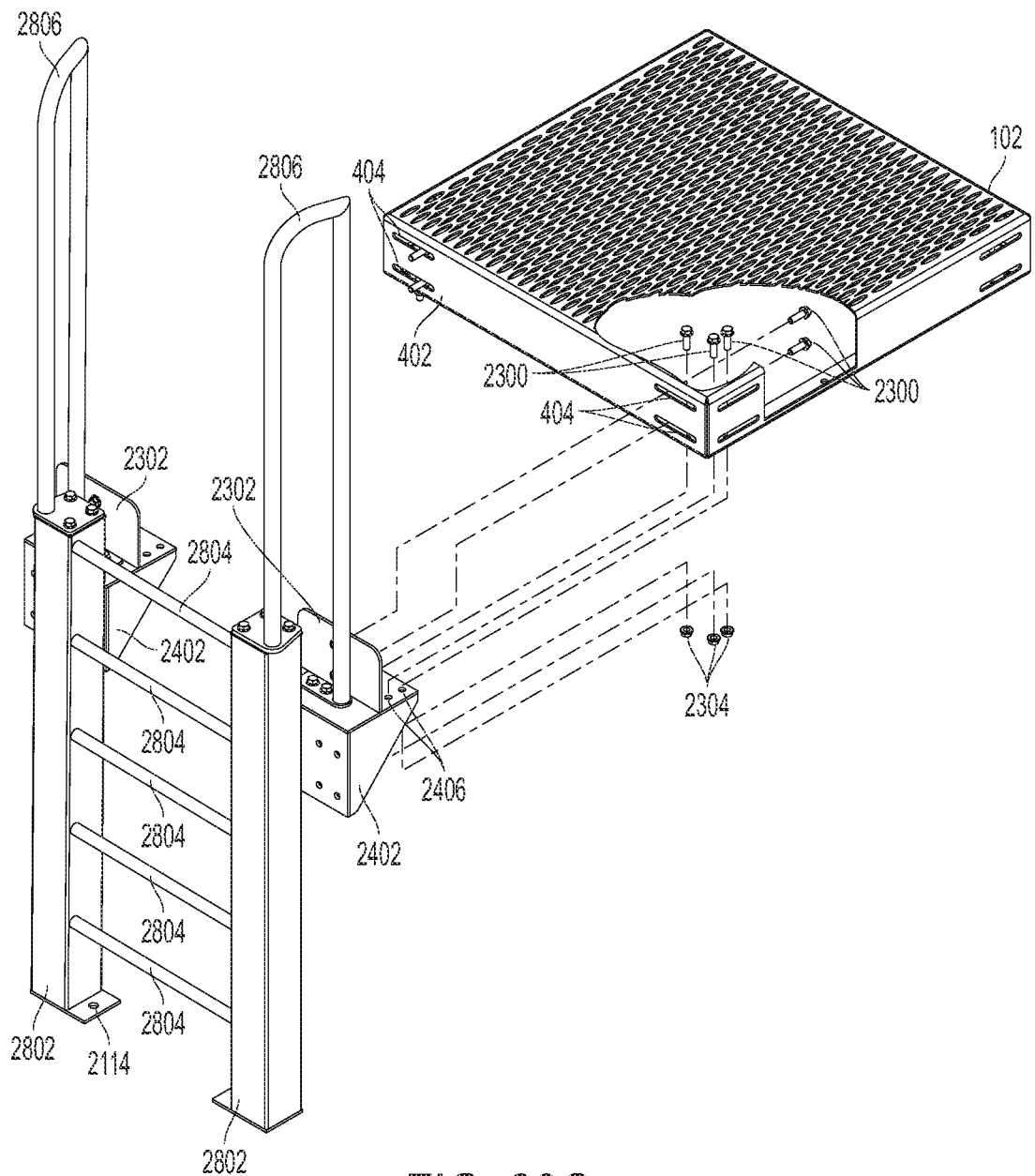

Referring to FIGS. 28A, 28B, and 28C, ladder component 2800 comprises two support beams 2802, a plurality of rungs 2804, and two handrails 2806. Each of handrails 2806 is connected to a top surface of a respective support beam 2802 at one end of the handrail and to a top surface of a respective gusset 2402 at the other end of the handrail. Each support beam 2802 defines a plurality of apertures to receive an end of each rung 2804. Support beams 2802 are identical to one another. Each of handrails 2806 and support beams 2802 is formed from a single, continuous piece of tubular metal in a manner similar to the formation of the handrails and stands described both above and in the applications incorporated herein by reference.

Ladder component 2800 is otherwise constructed and attached to platform 102 in a manner similar to that described above. Referring specifically to FIGS. 28B and 28C, for instance, backing plates 2302 and gussets 2402 are used to connect support beams 2802 to platform 102 in a manner similar to that described above with respect to FIG. 24C. That is, bolt and washer combinations 2300 are passed through each coaxially aligned set of apertures 404 and those defined by backing plate 2302 and set of apertures 508 (FIG. 5) and 2406 and secured into place by washer and nut combinations 2304. The base of support beams 2802 define an aperture 2114 that may be used to secure ladder component 2800 to a surface, such as the ground, in a manner similar to that described above with respect to FIGS. 13, 14, 15, 17, 19, and 21.

Figure 29A:
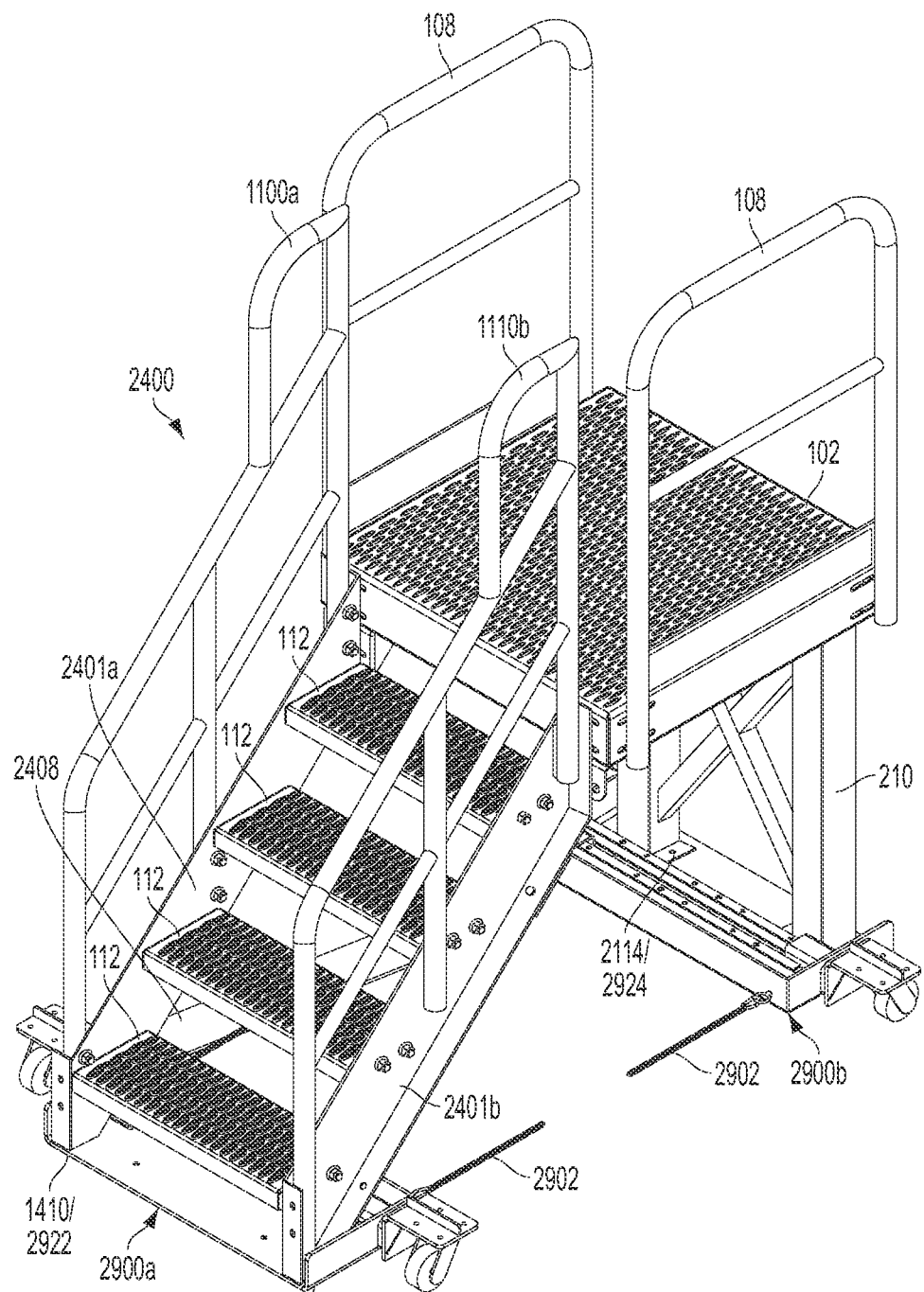
FIG. 29A is a perspective view of an exemplary platform system that includes a pair of mobile units in accordance with an embodiment of the present invention.
Figure 29B:
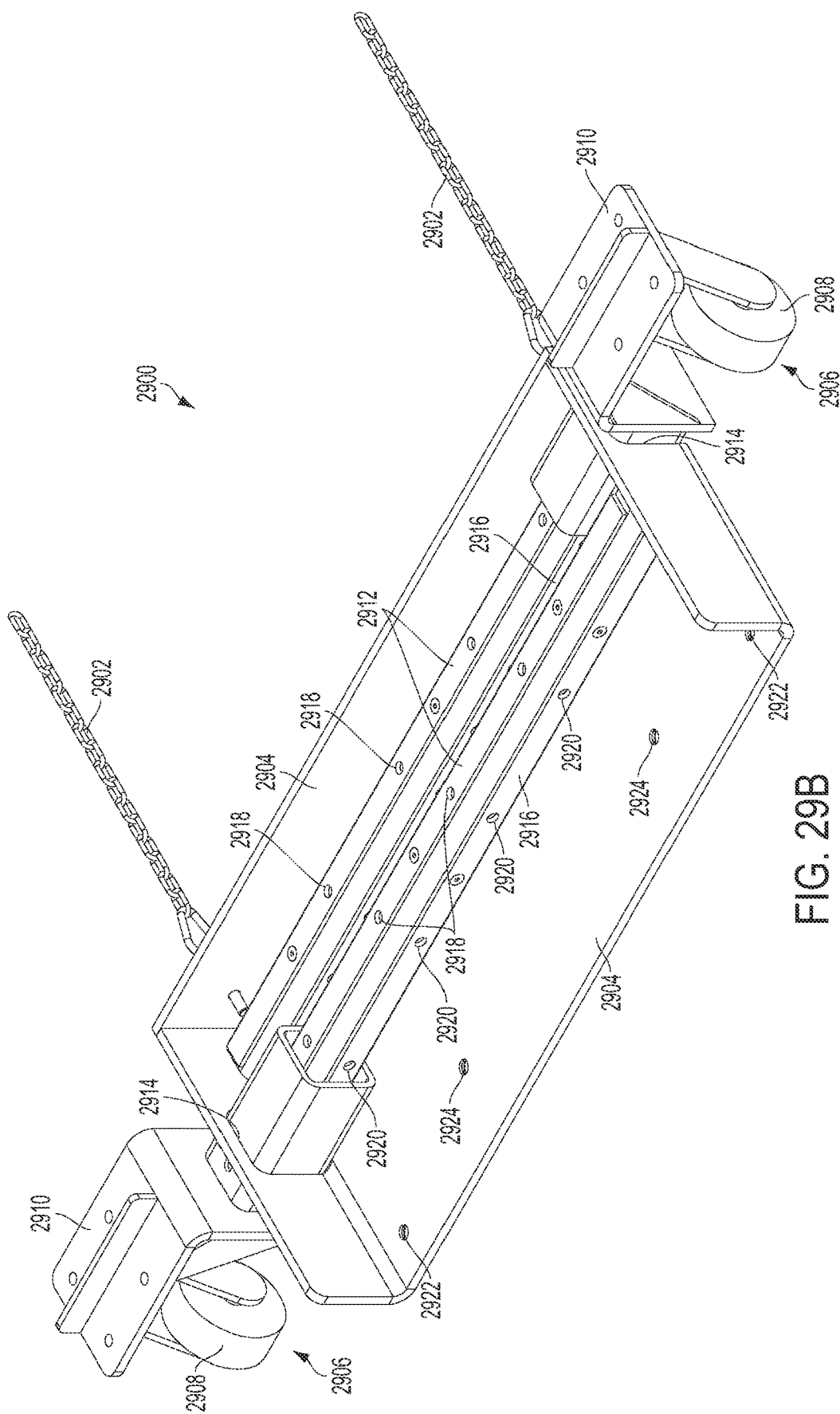
FIG. 29B is a perspective view of one of the mobile kits of FIG. 29A.

Referring to FIGS. 29A and 29B, mobile units 2900 allow mobilization of a platform system or a selected portion thereof. In the example illustrated in FIGS. 29A and 29B, the platform system comprises stairway 2400, platform 102, handrails 108, and stand 210. Stairway 2400 is connected to platform 102 in the manner described above with respect to FIG. 24C. Handrails 108 are connected to platform 102 in the manner described above with respect to FIG. 26. Stand 210 is connected to platform 102 in a manner similar to that described above with respect to FIG. 27A.

In the presently-described embodiment, mobile units 2900 are configured to connect to various components of the platform systems described herein, such as stairway supports 2401 and stand 210 as shown. Mobile units 2900 may be connected to one another via chains 2902 if desired. Each mobile unit 2900 comprises a base 2904 and a pair of wheeled portions 2906, each of which includes a wheel 2908 connected to a wheel bracket 2910. Each bracket 2910 includes an elongated portion 2912 configured to slideably pass through an aperture 2914 defined by base 2904 and into a tray portion 2916 of the base. Each elongated portion 2912 defines a plurality of apertures 2918 that correspond to apertures 2920 defined by the corresponding tray portion 2916. Each, elongated portion 2912 may be guided in and out of the respective tray portion 2916 in order to extend the corresponding wheeled portion 2906 away from or closer to base 2904. A suitable fastener is then passed through one or more corresponding coaxially aligned pairs of apertures 2918 and 2920 and tightened in order to secure each wheeled portion 2906 in a desired position.

Base 2904 also defines apertures 2922 and 2924 that are configured to allow other components of the platform system to connect to mobile unit 2900. In the presently-described embodiment, for instance, stairway 2400 is connected to mobile unit 2900a by coaxially aligning apertures 1410 of stairway supports 2401 with apertures 2922 of base 2904. A suitable fastener, such as the threaded bolt, nut, and washer combinations referenced above, is then used to secure stairway supports 2401 to base 2904 in a manner similar to that described above. Likewise, stand 210 is connected to mobile unit 2900b by coaxially aligning apertures 2114 of the stand with apertures 2924 of base 2904. A suitable fastener is then used to secure stand 210 to base 2904 in a manner similar to that described above. Those skilled in the art should appreciate that this mobilizes the platform system illustrated in FIG. 29A so that it may be moved from one location to another.

It should be understood that modifications may be made to the shape and size of any of the components described above without departing from the scope of the present invention. It should be noted, however, that should the dimensions of one component change, the dimensions of the other components may need to be altered to accommodate the changes. For instance, should a stairway support be extended in order to accommodate additional steps, the corresponding stairway handrail should be extended in a corresponding manner. Nonetheless, the above explanation provides a designer, manufacturer, installer, and operator with the ability to design, manufacturer, install, and use standard and interchangeable components of a modular platform system regardless of the shape, size, and environment of the location in which the platform system is to be installed. As a result, the costs associated with the design, manufacture, and installation of such a platform system are reduced.

It should also be understood that the above explanation describes a platform, each side of which is configured to receive a number of interchangeable components of a platform system. In one embodiment, for instance, each side of the platform is identical and defines a universal hole/mounting pattern. As a result, the other components of the platform system configured to attach to the platform, including other platforms, may be interchangeably connected to any side of the platform. This allows the platform system to be constructed and arranged as desired or necessary to fit a particular installation or environment. This also allows the components of the platform system to be mass-produced without knowledge of the particular installation. The platform system may then be designed "on the fly" without the necessity to alter the components for the installation. The ability to mass-produce the components without the need to alter the components reduces the costs associated with both the components themselves and the overall installation.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A platform system comprising:
    a horizontal platform structure configured to support a load imposed by a person standing or walking, said platform structure extending between a first end and a second end to define an axial direction;
    a first support structure located at said first end of said horizontal platform structure such that said first end of said horizontal platform structure is elevated and supported by said first support structure;
    a second support structure located at said second end of said horizontal platform structure such that said second end of said horizontal platform structure is elevated and supported by said second support structure;
    said platform structure having at least first and second modular platforms each comprising a top surface and first, second, third, and fourth side surfaces that are planar, dimensionally consistent, and mutually interchangeable with each other and define a square perimeter for said top surface, said side surfaces each comprising a respective side connection arrangement such that side connection arrangements of each of the first, second, third, and fourth side surfaces are functionally identical with each other such that any of the first, second, third, and fourth side surfaces of the first modular platform are connectable to any of the first, second, third, and fourth side surfaces of the second modular platform;
    a selected side surface of the first, second, third, and fourth side surfaces of the first modular platform being opposed to a selected side surface of said first, second, third, and fourth side surfaces of the second modular platform, said first and second modular platforms being interconnected using said respective side connection arrangement such that said selected side surface of said first modular platform and said selected side surface of said second modular platform form a connecting structure and support the load without a vertical support extending between the connecting structure and a ground surface; and said first modular platform and said second modular platform each having a respective one of first and second handrail structures, said first and second handrail structures each having a pair of vertical upright posts removably connected to a respective one of said first and second modular platforms such that the first and second handrail structures are aligned in the axial direction of the horizontal platform structure, wherein opposed adjacent side surfaces of the first and second modular platforms are connectable via a plurality of horizontal elongate fasteners.

2. The platform system of claim 1, wherein each of said first and second modular platforms includes four lips respectively extending inwardly from a bottom of the four side surfaces such that the lips are spaced apart and parallel to the top surface, each said lip defining a plurality of vertical connection apertures therethrough.

3. The platform system of claim 1, wherein said platform structure has at least three modular platforms extending in the axial direction.

4. The platform system of claim 1, wherein said side connection arrangements each comprise a plurality of apertures that align with corresponding apertures of another one of said side connection arrangements, the horizontal elongate fasteners being received in the plurality of apertures of said selected side surfaces.

5. The platform system of claim 4, wherein said plurality of apertures comprises a first group of apertures nearer to a first end of a respective side surface and a second group of apertures nearer to a second end of the respective side surface.

6. The platform system of claim 4, wherein said elongate fasteners are bolts each having a corresponding nut.

7. The platform system of claim 1, wherein each said handrail structure comprises a top rail, a horizontal midrail, and a horizontal toeboard.

8. The platform system of claim 1, wherein said platform structure further has at least one modular platform connected to the respective side surface of one of said first and second modular platforms that is adjacent said selected side surface in a direction lateral to said axial direction.

\* \* \* \* \*